(12) United States Patent
Truman et al.

(10) Patent No.: US 12,017,111 B2
(45) Date of Patent: Jun. 25, 2024

(54) HYDROTHERAPY APPARATUS CONVEYER RAISING AND LOWERING

(71) Applicant: Syspal Holdings Limited, Shropshire (GB)

(72) Inventors: Christopher John Truman, Shropshire (GB); Paul Easton Preece, Shropshire (GB); Laurence Stafford, Shropshire (GB)

(73) Assignee: Syspal Holdings Limited, Shropshire (GB)

( * ) Notice: Subject to any disclaimer, the term of this patent is extended or adjusted under 35 U.S.C. 154(b) by 477 days.

(21) Appl. No.: 17/244,030

(22) Filed: Apr. 29, 2021

(65) Prior Publication Data

US 2021/0339081 A1 Nov. 4, 2021

(30) Foreign Application Priority Data

Apr. 30, 2020 (GB) ..................................... 2006341

(51) Int. Cl.
*A63B 22/02* (2006.01)
*A61H 1/02* (2006.01)
*A63B 22/00* (2006.01)

(52) U.S. Cl.
CPC ....... *A63B 22/0235* (2013.01); *A61H 1/0262* (2013.01); *A63B 22/0023* (2013.01); *A61H 2201/1215* (2013.01); *A63B 2225/60* (2013.01)

(58) Field of Classification Search
CPC .... A01K 15/027; A61D 11/00; A61H 1/0262; A61H 33/6005; A61H 33/00; A63B 22/0235; A63B 22/02; A63B 2225/60; A63B 2208/03
See application file for complete search history.

(56) References Cited

U.S. PATENT DOCUMENTS

| 4,944,506 A | 7/1990 | Keller et al. |
| D606,205 S | 12/2009 | Truman et al. |

(Continued)

FOREIGN PATENT DOCUMENTS

| CN | 203886105 U | 10/2014 |
| CN | 205913708 U | 2/2017 |

(Continued)

OTHER PUBLICATIONS

Search Report for International Application No. EP 21171372.2, dated Oct. 25, 2021, 15 pages.

(Continued)

*Primary Examiner* — Megan Anderson
(74) *Attorney, Agent, or Firm* — Boyle Fredrickson, S.C.

(57) ABSTRACT

A hydrotherapy apparatus comprises a tank; a conveyer with a conveyer frame and drum mounted within the tank, and an actuator comprising: a guide mounted on an end region of the conveyer frame, the guide comprising a first portion and a second portion angled downwards with respect to, and closer to the drum than, the first portion; a glider arranged to be received by the guide; and an actuator shaft arranged to move the glider. The conveyer is arranged to be rotated around the axis of the drum by the actuator shaft moving the glider along the guide. The hydrotherapy apparatus may comprise a lifting arm rotatably connected to the conveyer frame, at a position spaced from the drum, at a first end region of the lifting arm, and arranged to be driven by the actuator so as to rotate the conveyer further.

12 Claims, 18 Drawing Sheets

(56) References Cited

U.S. PATENT DOCUMENTS

| | | | |
|---|---|---|---|
| 8,667,622 B2 | 3/2014 | Truman et al. | |
| 11,123,602 B2 * | 9/2021 | Kueker | A63B 22/0235 |
| 11,691,046 B2 * | 7/2023 | Yoo | A63B 24/0087 |
| | | | 119/700 |
| 2011/0294625 A1 | 12/2011 | Flake et al. | |
| 2019/0217182 A1 | 7/2019 | Kueker et al. | |

FOREIGN PATENT DOCUMENTS

| | | |
|---|---|---|
| CN | 108478994 A | 9/2018 |
| CN | 110711347 A | 1/2020 |
| DE | 202006009432 U1 | 10/2007 |
| JP | H1057519 A | 3/1998 |
| JP | 5253914 B2 | 7/2013 |
| WO | 2006085077 A2 | 8/2006 |
| WO | 2018056912 A1 | 3/2018 |

OTHER PUBLICATIONS

Combined Search and Examination Report for International Application No. GB2006341.8, filed Apr. 30, 2020, dated Oct. 23, 2020, 1 page.
Search Report for International Application No. GB2006341.8, filed Apr. 30, 2020, dated Oct. 22, 2020, 2 pages.
Examination Report for Application No. GB2006360.8, dated Apr. 25, 2022, 2 pages.

* cited by examiner

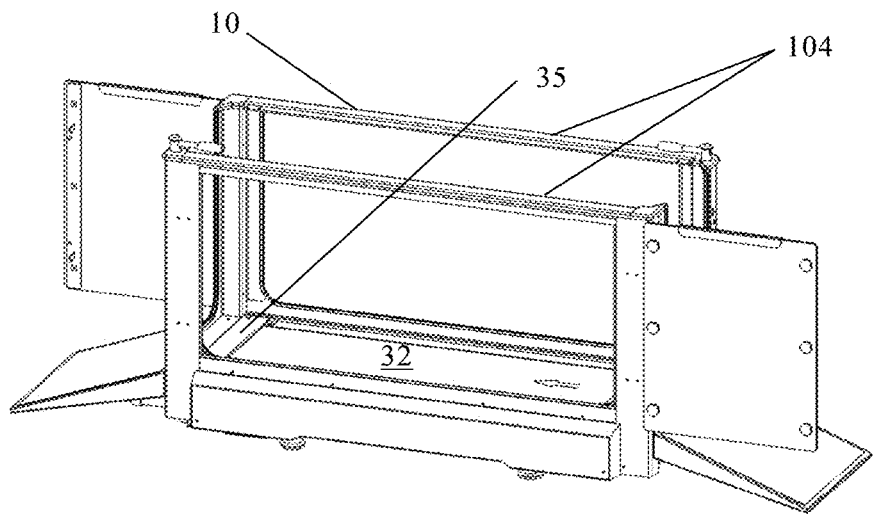
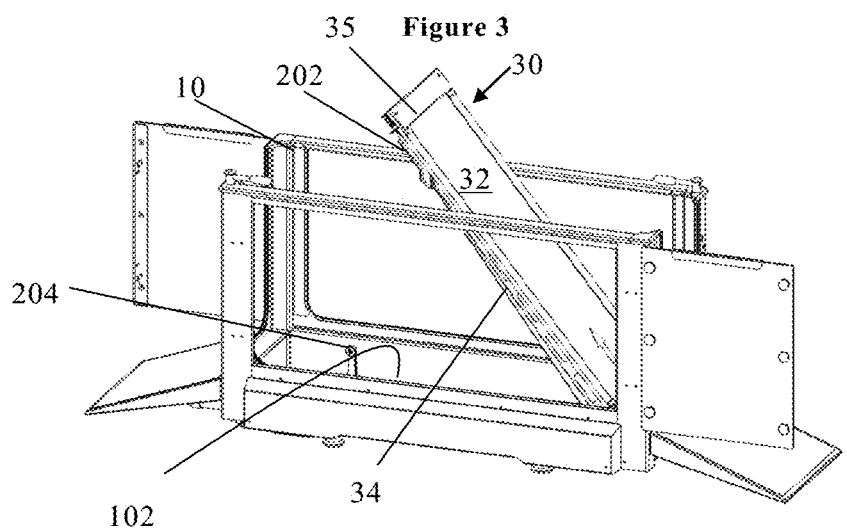
Figure 3
Figure 4
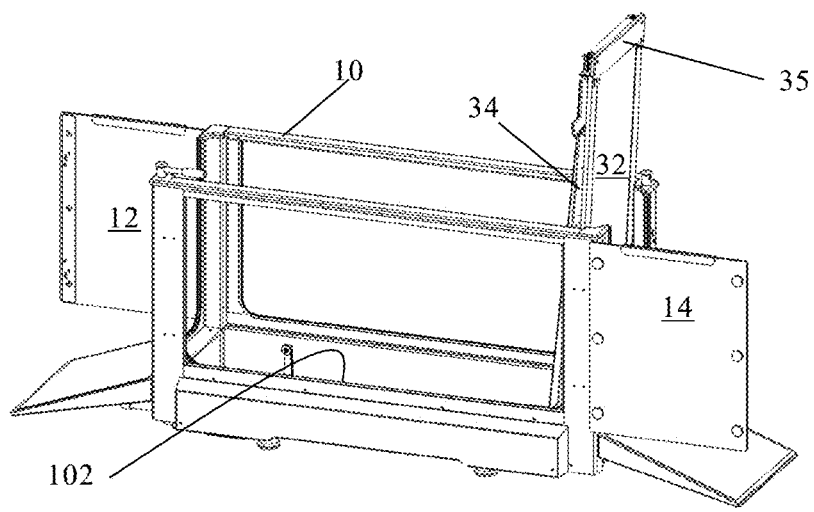
Figure 5

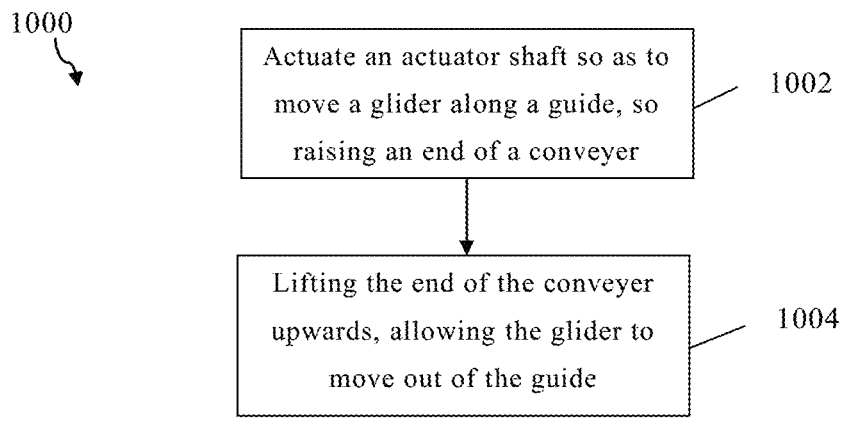
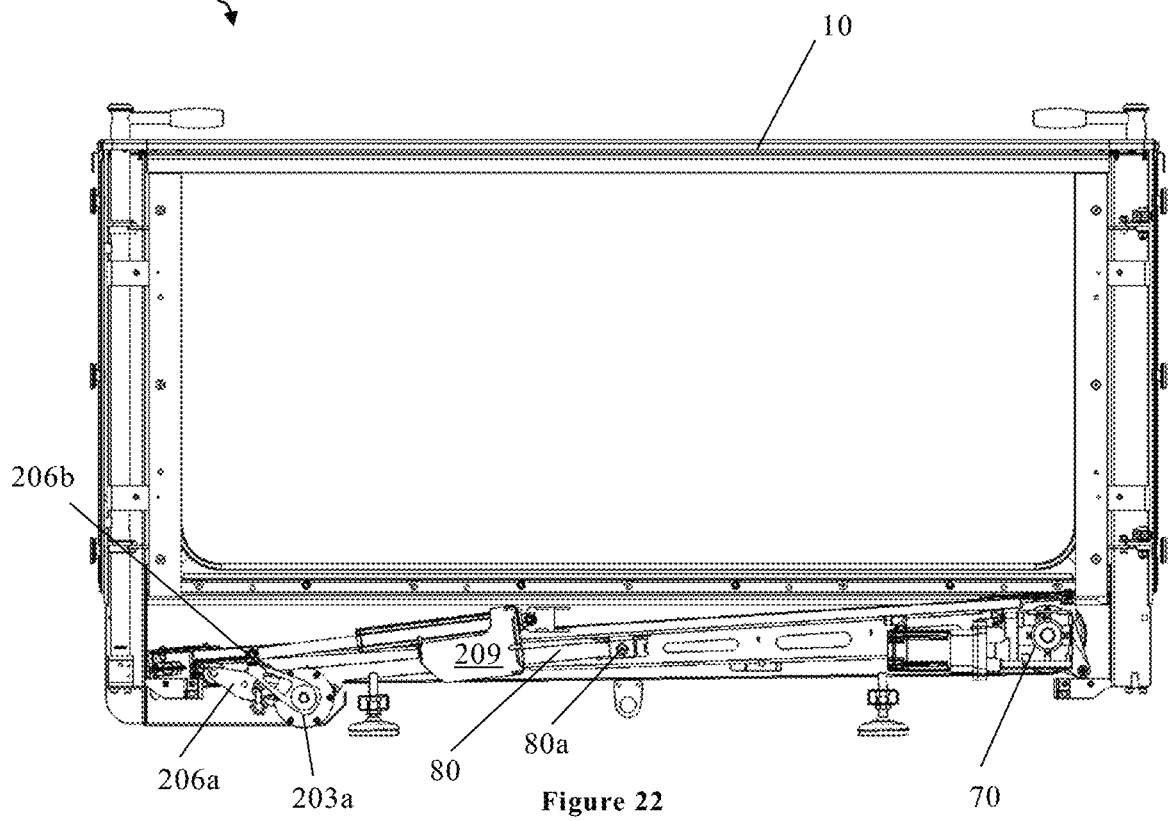

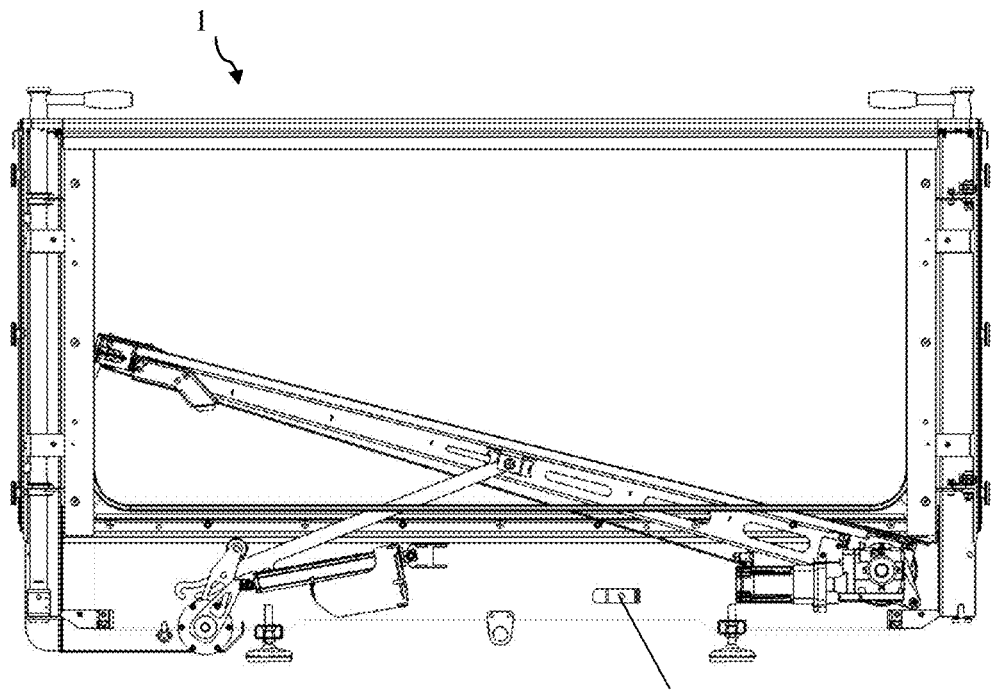
Figure 25   84
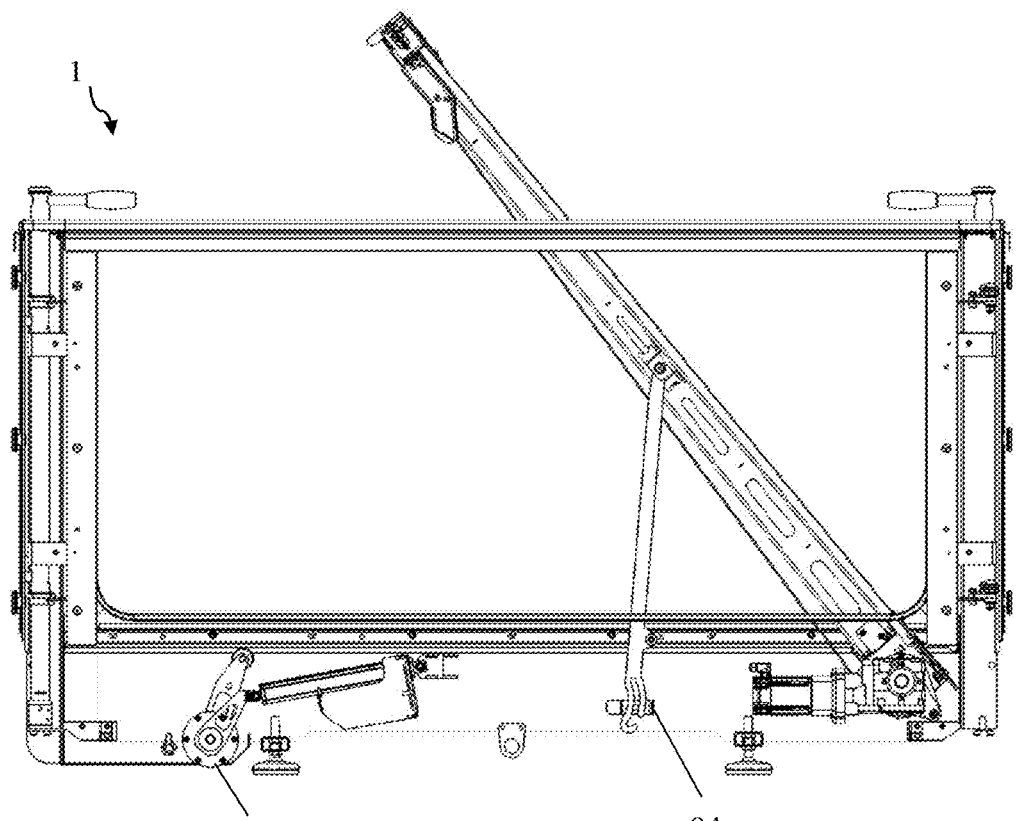
212   Figure 26   84

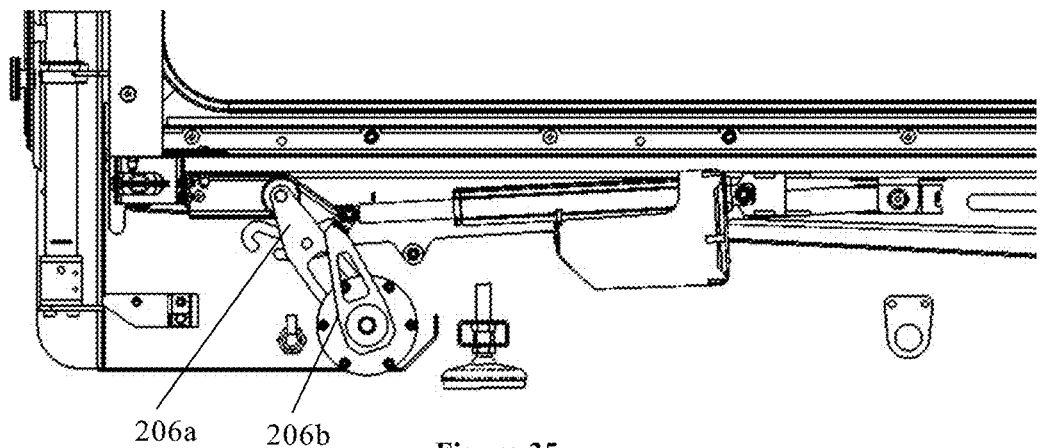
206a  206b    Figure 35
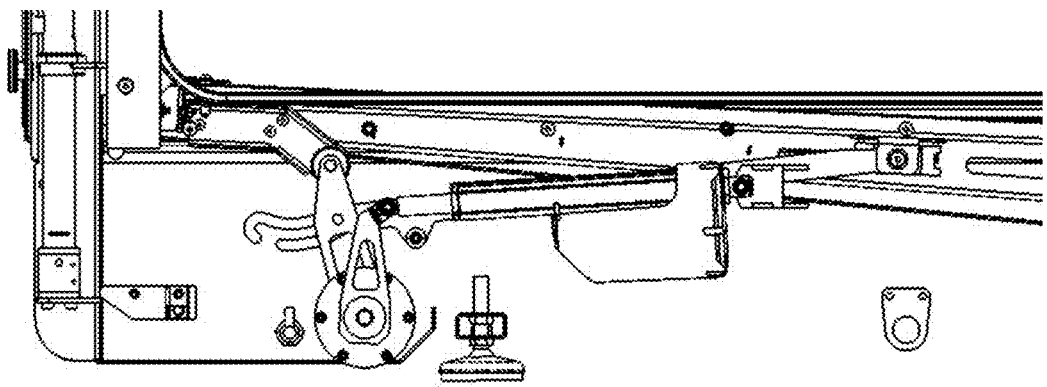
Figure 36
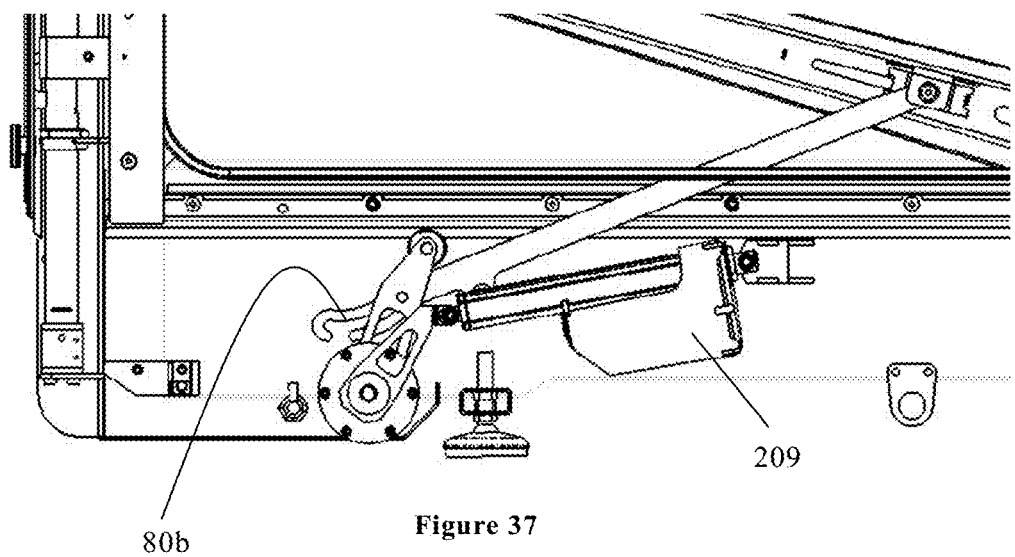
80b    Figure 37    209

HYDROTHERAPY APPARATUS CONVEYER RAISING AND LOWERING

BACKGROUND

The invention relates to a hydrotherapy apparatus, and to a method of moving components of such a hydrotherapy apparatus for maintenance and cleaning. More specifically, the invention relates to a hydrotherapy apparatus comprising a tank arranged to contain a liquid (e.g. water), and a treadmill or other conveyer suitable for underwater use located within the tank. In particular, but not exclusively, the invention relates to a hydrotherapy apparatus suitable for use by animals, and in particular domestic animals such as dogs, although other apparatus, such as for human, equine or livestock use, may also be envisaged.

Treadmills are used in physiotherapy and exercise regimes for both humans and animals. Using a treadmill underwater provides support to a user, which may be especially useful during post-injury or post-operative recovery, or to make exercise easier for those that are injured or have other health issues, such as having arthritis, etc. Most underwater treadmills are provided in a tank with an integral treadmill. The water is contained within the tank. The conveyer is generally arranged to be liftable so as to allow access to the lower part of the tank and the underside of the conveyer for cleaning, maintenance and repair.

In known hydrotherapy treadmills, the conveyer is generally arranged to be lifted by one or more gas struts. The gas struts are generally arranged to be used in rotating the conveyer around a longitudinal axis (i.e. an axis parallel to the length of the conveyer/tank) along one edge of the conveyer, and to hold the conveyer in the raised position for the duration of cleaning or the like. Conveyers arranged to be lifted by rotation along the drive shaft axis are also known; these are generally intended to be lifted manually. One or more fingerholds, handholds, or points for tool insertion, accessible from above, are generally provided in a frame of the conveyer to allow the conveyer to be gripped for lifting.

SUMMARY OF THE INVENTION

According to a first aspect of the invention, there is provided a hydrotherapy apparatus comprising: a tank; a conveyer mounted within the tank, the conveyer comprising a belt and a drum, wherein the belt is arranged to be driven by rotation of the drum and the drum comprises a drive shaft extending therefrom, and a conveyer frame extending from the drum, perpendicular to the drive shaft, and arranged to keep the belt under tension, the drum being rotatably mounted on the conveyer frame. The conveyer is arranged to be rotatable around the axis of the drive shaft. The hydrotherapy apparatus further comprises a pair of bearing housings fixedly mounted on the tank and extending into the tank, each bearing housing being arranged to rotatably receive a portion of the drive shaft, and having a cylindrical portion extending around the portion of the drive shaft; and a pair of blocks fixedly mounted on the conveyer frame, each block comprising an aperture therethrough arranged to receive a respective bearing housing and portion of the drive shaft. Each block is adjustable between:

(i) a first configuration in which the aperture is sized to receive the cylindrical portion of the respective bearing housing; and (ii) a second configuration in which the aperture is restricted to grip the outer surface of the cylindrical portion of the respective bearing housing, so impeding rotation of the conveyer.

In the first configuration, the aperture may be arranged to not impede rotation of the conveyer at all, or to only minimally impede rotation thereof. The aperture is large enough to receive the respective bearing housing comfortably—i.e. the aperture diameter is greater than the outer diameter of the relevant portion of the bearing housing. The aperture diameter may be only very slightly larger than the bearing housing diameter, so as to provide a close, sliding fit, or may be larger still such that the bearing housing is more loosely received.

In the first configuration, the aperture may be sized to provide a low-friction, sliding fit with an outer surface of the cylindrical portion of the respective bearing housing. Rotation of the conveyer may therefore not be impeded by the aperture in the first configuration. A relatively close fit between the bearing housing and the aperture may serve to facilitate correctly locating the conveyer within the tank.

A cross-section of the aperture of each block in a plane perpendicular to the drive shaft may comprise a circle with a gap. An adjustment means, such as a bolt, may be provided to tighten and loosen the block for adjustment between the first and second configurations. The adjustment means may be positioned across the gap.

The hydrotherapy apparatus may further comprise a seal. A bearing housing of the pair of bearing housings may be arranged to accommodate at least a part of the seal such that the portion of the drive shaft extending thereinto passes from a wet zone including the conveyer to a dry zone.

The hydrotherapy apparatus may further comprise a motor mounted to the outside of the tank. The motor may be arranged to drive the drive shaft by connection to a portion of the drive shaft in the dry zone.

The blocks may be made of plastic, for example high density polyethylene.

The blocks may be arranged to locate the conveyer, and more specifically the drum, within the tank by engaging with the bearing housings.

According to a second aspect, there is provided a method of moving a conveyer of a hydrotherapy apparatus. The conveyer comprises a belt and a drum with a drive shaft having an axis of rotation and being located within a tank, wherein the belt is arranged to be driven by rotation of the drum. The method comprises:

raising one end of the conveyer such that the conveyer rotates around the axis of rotation of the drum;

tightening a pair of blocks mounted on the conveyer such that each block grips a bearing housing for the drive shaft so as to impede rotation of the conveyer, each bearing housing being mounted on the tank; and lowering the end of the conveyer such that the conveyer rotates around the axis of rotation of the drum.

The method may further comprise loosening the pair of blocks mounted on the conveyer such that each block grips the respective bearing housing for the drive shaft less tightly (or not at all) so as to allow freer rotation of the conveyer prior to lowering the end of the conveyer.

Actions such as cleaning, checking, or maintaining the conveyer and/or tank, or retrieving an item lost beneath the conveyer belt, may be performed between the tightening and lowering steps, and optionally between the tightening and loosening steps.

According to a third aspect, there is provided a method of installing or adjusting a conveyer of a hydrotherapy apparatus, the conveyer comprising a belt and a drum with a drive shaft having an axis of rotation and being located within a tank, wherein the belt is arranged to be driven by rotation of the drum. The method comprises tightening a pair of blocks mounted on the conveyer such that each block grips a bearing housing for the drive shaft so as to impede rotation of the conveyer, each bearing housing being mounted on the tank.

The tightening may be performed until a desired amount of resistance to rotation is provided. The amount of resistance to rotation may be selected to allow a user to manually lift the conveyer, whilst preventing the conveyer from falling freely under gravity—slowing its fall to facilitate a user interrupting the fall without harm, if desired.

The method may comprise, prior to the tightening step, raising one end of the conveyer such that the conveyer rotates around the axis of rotation of the drum. Raising the conveyer may make an adjustment means for the blocks more easily accessible.

The hydrotherapy apparatus used to perform the method of the second and/or third aspects may be as described with respect to the first aspect.

According to a fourth aspect, there is provided a hydrotherapy apparatus comprising: a tank; a conveyer mounted within the tank, the conveyer comprising a belt and a drum, wherein the belt is arranged to be driven by rotation of the drum and the drum comprises a drive shaft extending therefrom, and a conveyer frame extending from the drum, perpendicular to the drive shaft, and arranged to keep the belt under tension, the drum being rotatably mounted on the conveyer frame, wherein the conveyer is arranged to be rotatable around the axis of the drive shaft; and an actuator. The actuator comprises:

a guide mounted on an end region of the conveyer frame furthest from the drum, the guide comprising a first portion and a second portion angled downwards with respect to the first portion, the second portion being closer to the drum than the first portion;

a glider arranged to be received by the guide; and an actuator shaft mounted on the tank and arranged to move the glider, and wherein the conveyer is arranged to be rotated around the axis of the drive shaft by the actuator shaft moving the glider along the first portion of the guide and onto the second portion of the guide, thereby raising the end region of the conveyer frame furthest from the drum.

The actuator may thereby raise the end region of the conveyer frame furthest from the drum to a position above the horizontal, such that an end of the conveyer frame protrudes above a base of the tank, optionally by a sufficient distance for a user's hand or a tool to be inserted below the conveyer frame so as to lift it further. The skilled person would appreciate that gym treadmills may comprise actuators arranged to lower the end region of the conveyer frame furthest from the drum so as to provide an upwards slope for a treadmill user, to increase intensity of exercise. However, as well as being of a different design, such actuators are not arranged to raise the end region of the conveyer frame furthest from the drum to a position above the horizontal, but rather between positions below or at the horizontal level. In some embodiments of the present invention, the actuator used to raise the end region of the conveyer frame furthest from the drum to a position above the horizontal (e.g. for maintenance or cleaning) may also be used to lower the end region of the conveyer frame furthest from the drum whilst in use, to increase slope for a user. Use of the same actuator may reduce system cost and/or weight as compared to use of a separate raising system.

The first portion of the channel may be oriented parallel to the belt.

The hydrotherapy apparatus may further comprise a rotatable connector or glider arm on which the glider is mounted. The arm/connector may be rotatably mounted on the tank, and may be arranged to be rotated by the actuator shaft.

The hydrotherapy apparatus may further comprise a second guide. The second guide may be symmetrical to the first guide, and may be mounted on the opposite side of the belt from the first guide. Both guides may be mounted on the end region of the conveyer frame furthest from the drum. A second glider may be provided correspondingly.

Movement of the actuator shaft may be arranged to raise the end region of the conveyer frame furthest from the drum far enough to raise it at least partially above a lower edge of the tank, for example such that an underside of the conveyer may be made accessible. This movement of the actuator shaft may be powered electrically.

The glider and guide may be arranged such that the guide can be lifted off the glider, when the end region of the conveyer frame furthest from the drum is raised further. This may allow the conveyer frame to be moved to an at least substantially vertical position, with the glider separated from the guide. The glider may slide out of the end of the second portion of the guide furthest from the first portion.

The hydrotherapy apparatus may be arranged such that, when the conveyer frame is lowered towards the actuator, the glider connects with the guide (e.g. entering the guide) and one or more of (i) the weight of the conveyer frame, (ii) a force applied by a user lowering the conveyer, and (iii) a force applied by the actuator, causes the glider to move from the second portion of the guide to the first portion of the guide, so capturing the conveyer frame and holding it in a low position. A force—provided by gravity, a user, and/or the actuator—may therefore cause the glider to move from the second portion of the guide to the first portion of the guide, so capturing the conveyer frame and holding it in a low position The guide may be a channel. The glider may be a roller or slider arranged to be received within, and to move within, the channel. The guide may be a track. The glider may be a roller or slider arranged to grip, and to move along, the track.

The hydrotherapy apparatus may further comprise:

a pair of bearing housings fixedly mounted on the tank and extending into the tank, each bearing housing being arranged to rotatably receive a portion of the drive shaft, and having a cylindrical portion extending around the portion of the drive shaft; and a pair of blocks fixedly mounted on the conveyer frame, each block comprising an aperture therethrough arranged to receive a respective bearing housing and portion of the drive shaft, and wherein each block is adjustable between:

(i) a first configuration in which the aperture is sized to receive the cylindrical portion of the respective bearing housing; and (ii) a second configuration in which the aperture is restricted to grip the outer surface of the cylindrical portion of the respective bearing housing, so impeding rotation of the conveyer. The hydrotherapy apparatus may therefore be as described with respect to the first aspect.

The hydrotherapy apparatus may further comprise:

a connector arranged to couple the glider to the actuator shaft, the connector being rotatably mounted on the tank, and having the glider mounted thereon;

a pin mounted on the connector and extending, parallel to conveyer width (optionally perpendicularly to the connector); and a lifting arm rotatably connected to the conveyer frame, at a position spaced from the drum, at a first end region of the lifting arm, and having a slot arranged to slidingly receive the pin in a second end region of the lifting arm.

and wherein the pin and slot are arranged such that, as the glider moves along the guide, the pin slides along the slot, such that the actuator only applies a force to the lifting arm in a direction along the conveyer once the glider nears or reaches the end of the guide closest to the drum. The hydrotherapy apparatus may therefore be as described with respect to the sixth aspect, below.

According to a fifth aspect, there is provided a method of controlling movement of a conveyer of a hydrotherapy apparatus within a tank of the hydrotherapy apparatus, the conveyer comprising a belt and a drum with a drive shaft having an axis of rotation and being located within a tank, wherein the belt is arranged to be driven by rotation of the drum. The method comprises actuating an actuator so as to move a glider along a guide, the movement of the glider along the guide pushing an end region of the conveyer frame furthest from the drum upwards; and lifting the end region of the conveyer frame furthest from the drum further upwards, allowing the glider to move out of the guide (e.g. lifting the guide off the glider).

In the embodiment being described, the actuator is arranged to move the glider towards the drum so as to raise the end region of the conveyer furthest from the drum. The actuating the actuator may raise the end region of the conveyer frame sufficiently to make at least one of the following accessible for use in the subsequent lifting step: (i) the underside of the conveyer; and (ii) a lifting point, such as a handhold, on the conveyer frame. Alternatively or additionally, the actuating the actuator may raise the end region of the conveyer frame sufficiently to align a second lifting mechanism to take over from the first and rotate the conveyer further, optionally using the same actuator/actuator shaft.

The actuating the actuator may move a rotatable glider arm mounted on the tank, the movement of the glider arm causing the glider, which is mounted on the glider arm, to move along the guide.

The method may further comprise, after lifting the end region of the conveyer frame furthest from the drum upwards, tightening a pair of blocks mounted on the conveyer such that each block grips a bearing housing for the drive shaft so as to impede rotation of the conveyer, each bearing housing being mounted on the tank.

According to a sixth aspect, there is provided a hydrotherapy apparatus comprising:

a tank;

a conveyer mounted within the tank, the conveyer comprising a belt and a drum, wherein the belt is arranged to be driven by rotation of the drum and the drum comprises a drive shaft, and a conveyer frame extending from the drum, perpendicular to the drive shaft, and arranged to keep the belt under tension, the drum being rotatably mounted on the conveyer frame, wherein the conveyer is arranged to be rotatable around the axis of the drive shaft;

a lifting arm rotatably connected to the conveyer frame, at a position spaced from the drum, at a first end region of the lifting arm; and an electrically-powered actuator, wherein the electrically-powered actuator is arranged to act on a second end region of the lifting arm so as to cause the lifting arm to move, thereby raising the end region of the conveyer frame furthest from the drum.

The lifting arm may be used to raise the end region of the conveyer frame furthest from the drum from a first position above the horizontal to a second position further above the horizontal. It will be appreciated that, in use as a treadmill, the conveyer is either level (horizontal) or angled so as to provide an upward slope towards the drum—the end region of the conveyer frame furthest from the drum is therefore horizontal or below the horizontal in use, and is generally only lifted for maintenance or cleaning.

In the embodiment being described, the actuator is arranged to move the second end region of the lifting arm towards the drum so as to raise the end region of the conveyer furthest from the drum. The actuator, and in particular an actuator shaft of the actuator, may be mounted on the tank.

The first end region of the lifting arm may be connected to the conveyer frame at a position less than or equal to halfway along the length of the conveyer frame from the drum.

A pair of lifting arms may be provided, for example one located at each side of the conveyer and connected to a respective side of the conveyer frame. Optionally the two lifting arms may be rigidly coupled together by a spacer extending between the two.

The or each lifting arm may be detachably coupled to the actuator, such that once the conveyer frame has been lifted to the limit of the actuator's movement, the lifting arm can be decoupled so as to allow the conveyer frame to be rotated further, optionally manually. The hydrotherapy apparatus may further comprise an attachment point arranged to receive the second end region of the lifting arm when the conveyer is rotated further, so securing the conveyer frame in the further rotated position.

The hydrotherapy apparatus may further comprise a first raising mechanism arranged to lift the conveyer to a first, slightly raised position, just above the horizontal. The first raising mechanism may be as described with respect to the fourth aspect, or may be different—for example comprising or consisting of a vertically-mounted actuator shaft, a gas-strut, and/or a manually-adjustable lifting mechanism. The lifting arm may be arranged to lift the conveyer from the first position to a second position (further above the horizontal).

The hydrotherapy apparatus may comprise all features of the fourth aspect, and the second end region of the lifting arm may be coupled to the actuator shaft, such that the same actuator moves both the glider and the lifting arm. In such embodiments, the glider may be coupled to the actuator shaft by a connector, the connector optionally being rotatably mounted on the tank and having the glider mounted thereon and comprising a pin extending parallel to conveyer width. The connector may take the form of one or more arms or struts, rotatably mounted to the tank at one end and with the glider mounted thereon at or near the other end. The second end region of the lifting arm may comprise a slot, the slot being arranged to slidingly receive the pin. The pin and slot may be arranged such that, as the glider moves along the guide, the pin slides along the slot, such that the actuator only applies a force to the lifting arm once the glider nears or reaches the end of the guide closest to the drum. The force may be applied in a direction along the conveyer, towards the drum. In some embodiments, the actuator may apply a force in a different direction to the lifting arm before the glider nears or reaches the end of the guide closest to the drum; for example raising it slightly before then pushing it when the glider reaches the end of the guide. The connector may be double-walled, with the pin extending between the walls, and the lifting arm may be arranged to pass between the connector walls. The walls may help to guide the slot of the lifting arm back onto the pin. The slot may comprise an opening on its lower side, near the second end of the lifting arm, the opening being arranged to allow the pin to pass therethrough so as to disengage and reengage the lifting arm with the actuator.

Features described in relation to one of the above aspects of the invention may be applied, mutatis mutandis, to the other aspect of the invention. In particular, the braking mechanism may be used with the actuator, or each may be used separately, and the actuator may be used with or without the lifting arms. Similarly, the lifting arms may be used with a different first lifting mechanism in place of the specific actuator described for the fourth aspect, and with or without the braking mechanism described with respect to the first aspect. Further, the features described may be applied to the or each aspect in any combination. In addition, a kit of parts containing components arranged to be assembled to form a hydrotherapy apparatus according to any aspect detailed above may be provided. The kit of parts may exclude panels arranged to form tank walls in some embodiments, as the panels may be locally sourced by a purchaser to reduce cost and difficulty of transport.

DESCRIPTION OF THE DRAWINGS

There now follows by way of example only a detailed description of embodiments of the present invention with reference to the accompanying drawings in which:

FIG. 3 shows a perspective view of a hydrotherapy apparatus in a position for use of the conveyer/treadmill;

FIG. 4 shows a perspective view of the hydrotherapy apparatus of FIG. 3 with the conveyer raised to an angle of around 50°;

FIG. 5 shows a perspective view of the hydrotherapy apparatus of FIGS. 3 and 4 with the conveyer raised to an angle of around 90°;

FIG. 21 illustrates a conveyer lifting method of various embodiments;

FIG. 22 shows a side view of a similar hydrotherapy apparatus to that shown in the earlier figures but additionally including a pair of lifting arms, in an in-use, downwardly sloped position (first conveyer position);

FIG. 25 shows a side view of the hydrotherapy apparatus of FIG. 22 in a further raised position, lifted by the lifting arms support the conveyer (fourth conveyer position);

FIG. 26 shows a side view of the hydrotherapy apparatus of FIG. 22 in a further raised position, with the lifting arms supporting the conveyer (fifth conveyer position);

FIG. 35 shows a close-up side view of the actuator of the hydrotherapy apparatus of FIG. 22 in the second conveyer position;

FIG. 36 shows a close-up side view of the actuator of the hydrotherapy apparatus of FIG. 22 in the third conveyer position;

FIG. 37 shows a close-up side view of the actuator of the hydrotherapy apparatus of FIG. 22 in the fourth conveyer position;

In the figures, like reference numerals are used for like components.

DETAILED DESCRIPTION OF THE PREFERRED EMBODIMENTS

Figure 1:
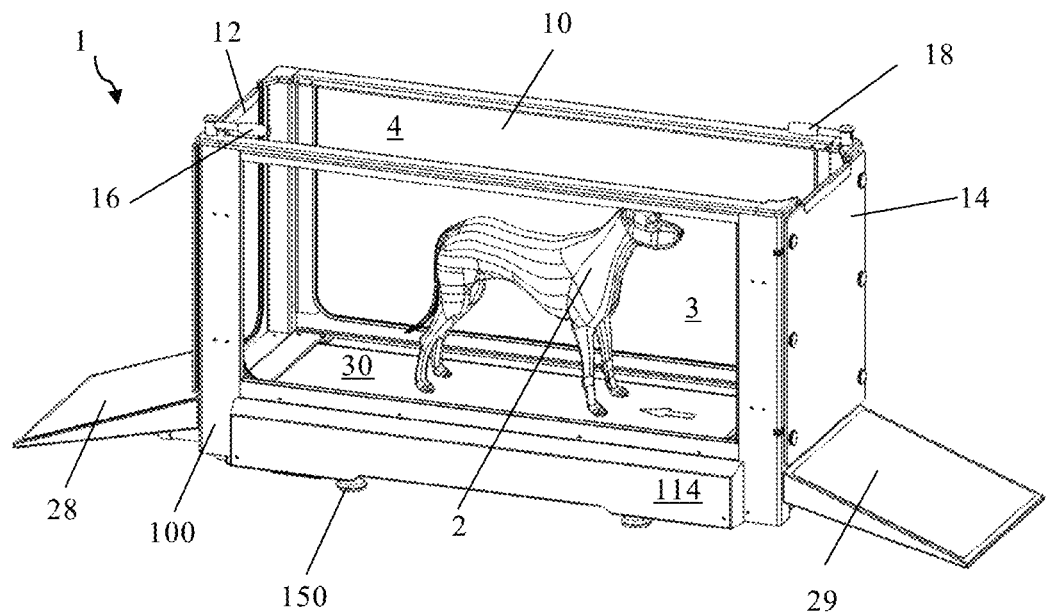
FIG. 1 shows a perspective view of a hydrotherapy apparatus of an embodiment.

FIG. 1 shows a hydrotherapy apparatus 1 comprising a tank 10. The tank 10 is cuboid in shape in the embodiment shown, with three substantially transparent sides and one opaque side. All sides of the tank 10 may be substantially transparent in other embodiments, or any combination of sides may be translucent or opaque as desired.

The tank 10 is rectangular in plan view and comprises a first door 12 and a second door 14 at each of the minor ends of the tank 10. In other embodiments, only one door may be provided. One door 12 is substantially transparent and the second door 14 is opaque in the example shown—this may vary in other embodiments, for example, all four sides of the tank 10 may be transparent. Each of the doors 12, 14 has associated therewith a handle 16, 18 which operates a door closing mechanism. In other embodiments, only a single door may be provided. The or each door may have a closing mechanism as described in EP1850825 (B1). The closing mechanism as described therein serves the purpose of allowing access from either outside or inside the tank (therapists often accompany patients) and provides a water-tight seal between the door(s) 12, 14 and tank 10.

In the closed position, as shown in FIG. 1, each of the doors 12, 14 forms a water-tight seal with the body of the tank, and the tank 10 is, in use, filled with a liquid. Generally, this liquid is water.

A ramp 28 is provided such that an animal or human (hereinafter referred to as a user 2) may easily enter the tank 10. A similar ramp 29 is provided at the opposite end of the tank such that a user 2 may exit the tank 10. Having a door 12, 14 at each end of the tank may be advantageous since it allows a user 2 to enter and exit the tank without having to turn around—the skilled person would appreciate that this may be of particular utility for rehabilitation, where certain movements such as turning may be difficult, and/or for non-human users. A step may be provided instead of a ramp 28 in other embodiments. Optionally, a raised deck may be provided around the tank 10 to reduce the step up (or to reduce ramp length or steepness, if both are present).

The hydrotherapy apparatus comprises a conveyer 30 located within the tank 10. The conveyer 30 comprises a belt 32 arranged to move in the direction indicated by the arrow in FIG. 1 (i.e. along the length of the tank 10), so as to provide a moving surface on which the user 2 can walk, jog or run for exercise.

In the embodiment shown, the substantially transparent side walls 3, 4 of the tank 10 each comprise a panel of glass 3, 4 mounted to a frame 100. In alternative embodiments, a panel 3, 4 of a different material may be used instead of glass (e.g. Perspex or metal), and/or the glass may not be transparent, or an entirely different wall design may be used.

In the embodiment being described, the frame 100 comprises a lower portion 102 in a lower region of the tank 10, which forms a base of the tank 10. In the embodiment shown, the base 102 is not the lowest part of the apparatus 1—feet 150 (which may be adjustable) are mounted on the underside of the base 102 and arranged to support the tank 10. The ramps 28, 29 similarly extend below the level of the base 102 to meet a floor or other surface on which the apparatus 1 is located.

The base 102 is arranged to contain the conveyer 30 in use, with an upper surface of the belt 32 exposed for a user 2 to stand thereon. The conveyer 30 comprises a conveyer frame 34 on which the belt 32 is mounted. The conveyer frame 34 is arranged to keep the belt 32 taut and in position in use. The conveyer 30 comprises a drum 36. The drum 36 is rotatably mounted on the conveyer frame 34, and arranged to cause the belt 32 to rotate. The drum 36 comprises a drive shaft 38. The drive shaft 38 is arranged to be driven by a gearbox and motor 70 so as to rotate the drum 36, and thereby the belt 32. A motor 70 may be provided without a gearbox in other embodiments.

Each end region of the drive shaft 38 extends into a bearing housing 40. A pair of bearing housings 40 are provided in the embodiment shown—one mounted on each side of the tank 10 and each arranged to receive one end region of the drive shaft 38. In the embodiment shown, one end region of the drive shaft 38 extends into a bearing housing 40 and out the other side, where it meets a gearbox and motor 70. The other end region of the drive shaft 38 extends into a bearing housing 40 and ends within the bearing housing.

Figure 2:
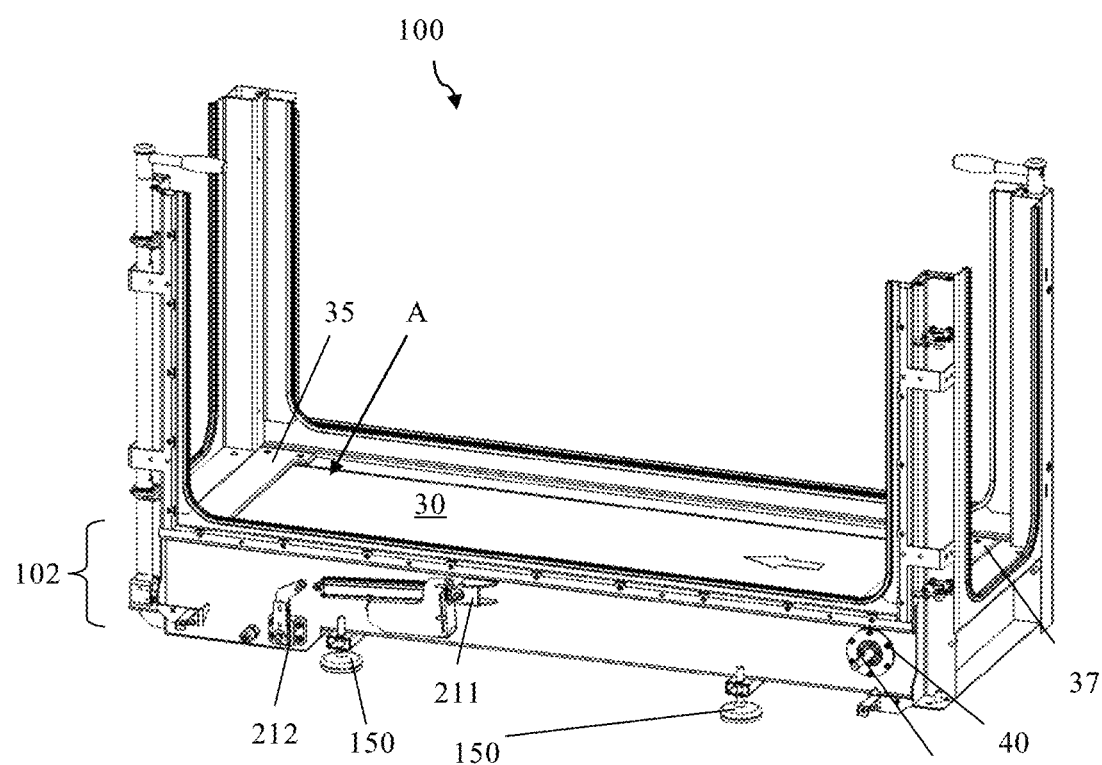
FIG. 2 shows a perspective view of a frame of the hydrotherapy apparatus of FIG. 1, showing an actuator and bearing housing.
Figure 6:
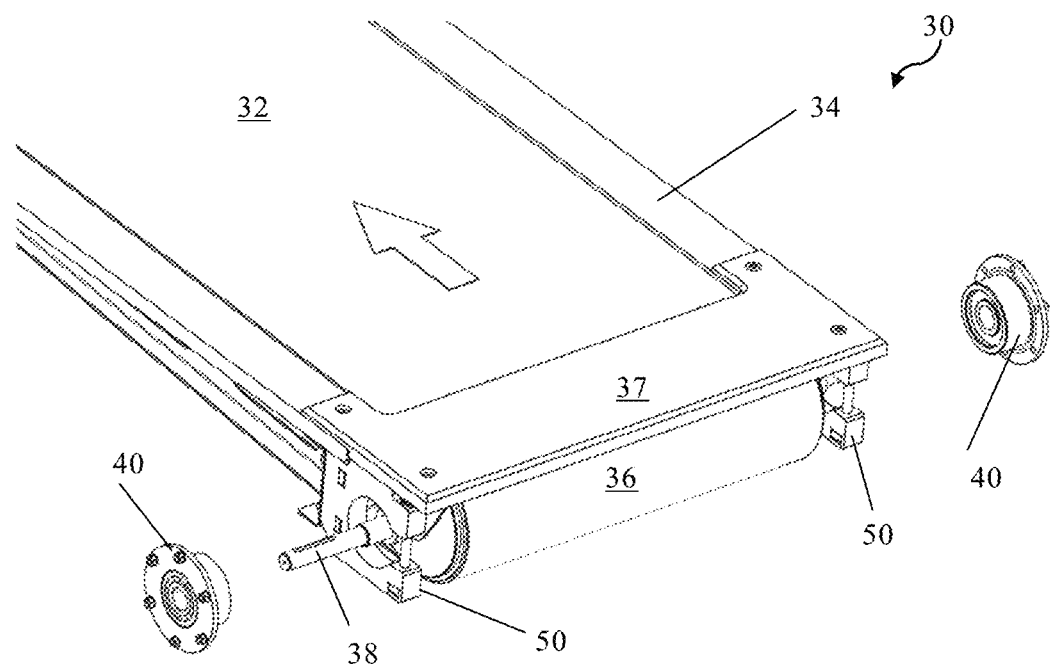
FIG. 6 shows a perspective view of a portion of the conveyer of the earlier figures, including adjustable blocks, and bearing housings for the conveyer.
Figure 7:
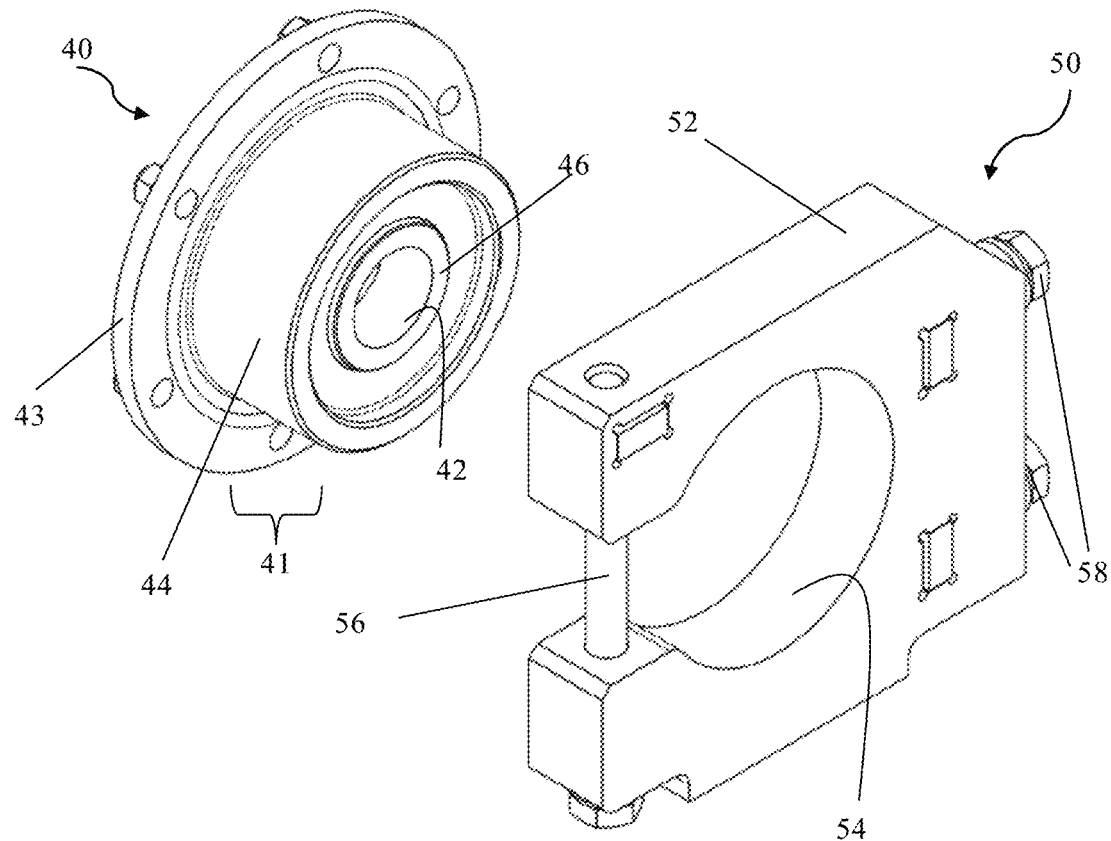
FIG. 7 shows a perspective view of an adjustable block and bearing housing as shown in FIG. 6.
Figure 8:
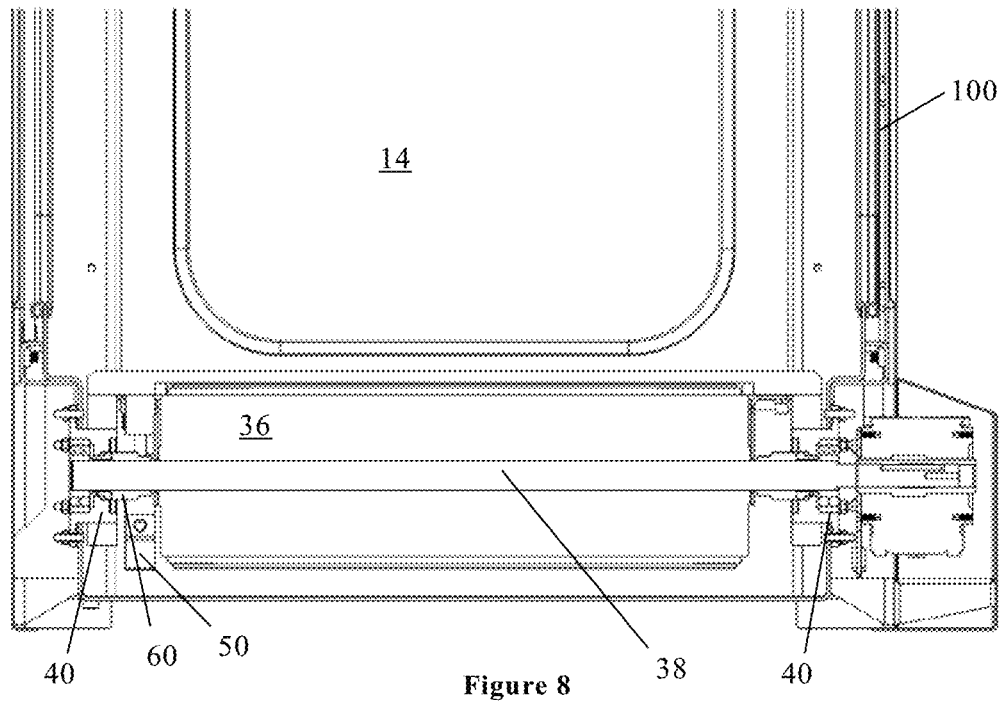
FIG. 8 shows a sectional end view of the hydrotherapy apparatus, along the drive shaft.
Figure 9:
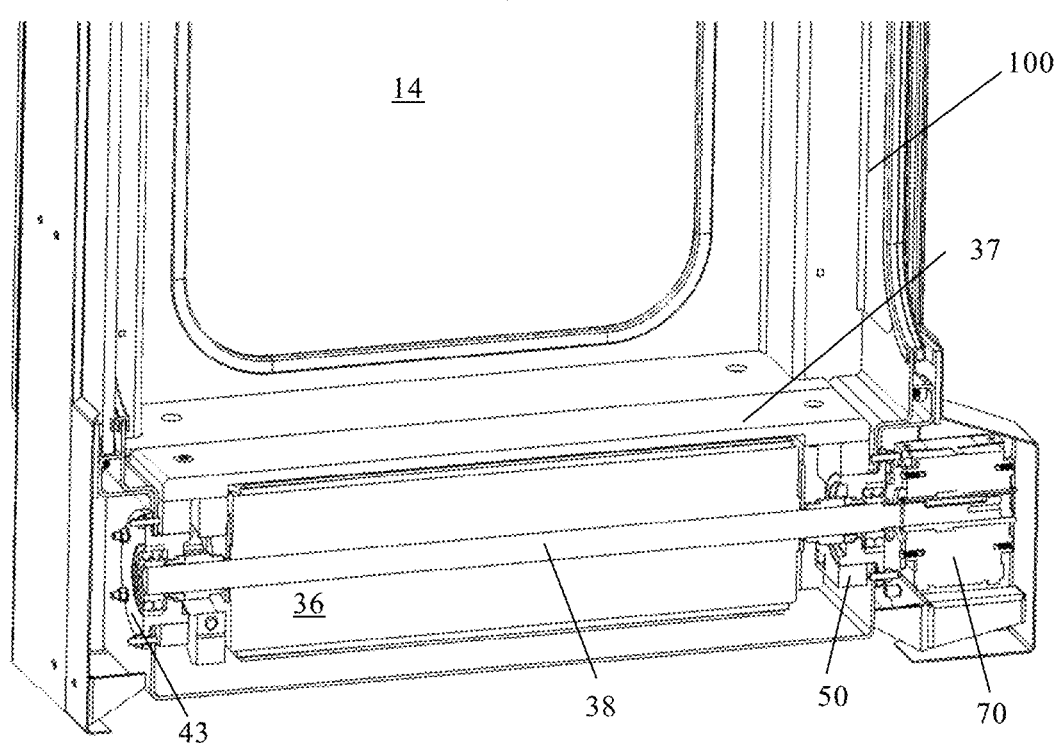
FIG. 9 shows a sectional perspective view of the hydrotherapy apparatus, along the drive shaft.
Figure 10:
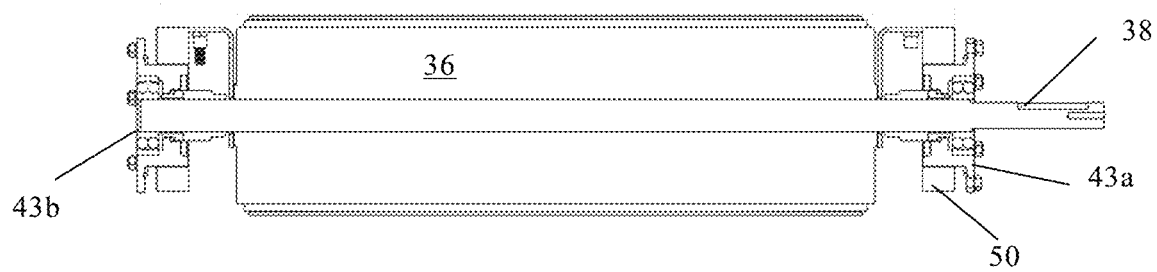
FIG. 10 shows a sectional end view of the motor, blocks, and bearing housings, along the drive shaft.
Figure 11:
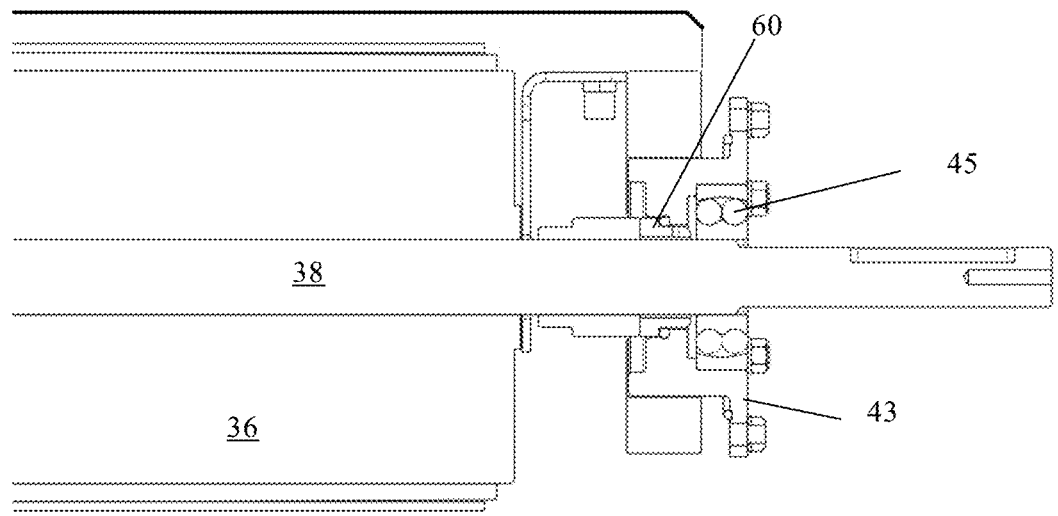
FIG. 11 shows an enlarged portion of the view of FIG. 10.
Figure 12:
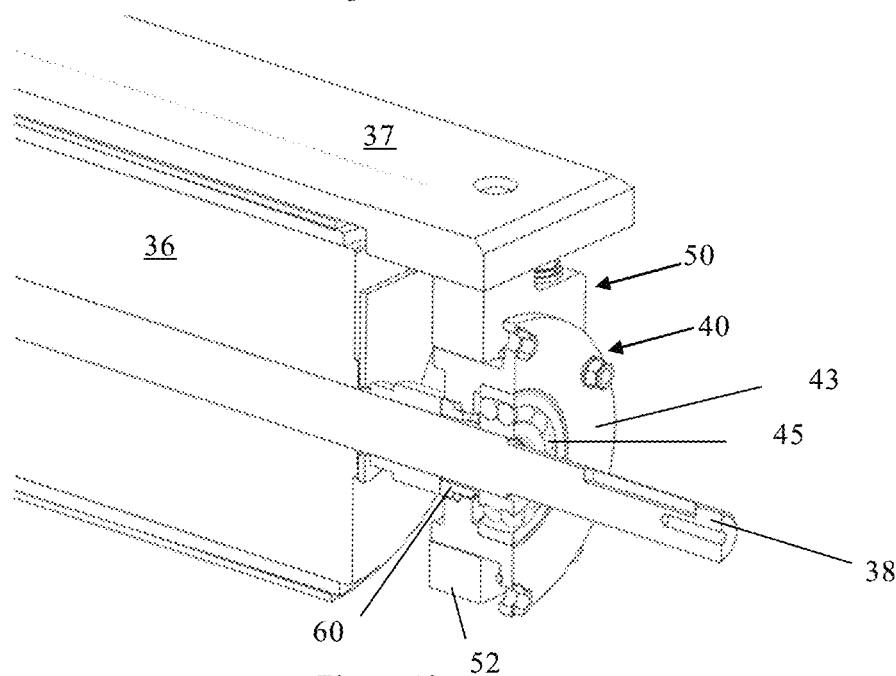
FIG. 12 shows a perspective sectional view corresponding to FIG. 11.

In the embodiment shown, the bearing housings 40 are mounted onto the tank by inserting a portion 41 of the bearing housing 40 through a hole in the base 102 of the tank 10, and screwing a plate 43 surrounding an outer side of the first portion 41 of the bearing housing 40 onto the base 102. In the embodiment shown, the hole in the base 102 of the tank 10 is circular, and the first portion 41 is cylindrical and has an outer surface 44 which is smooth and cylindrical. The outer surface 44 may be sized to provide an engaging fit with the hole in the base 102 in some embodiments, and/or a seal may be provided around the outer surface 44 and/or on the plate 43. The bearing housing 40 has a cylindrical aperture 42 arranged to receive the drive shaft 38. In the example shown in FIGS. 1 and 2, the drive shaft 38 is arranged to extend through the cylindrical aperture 42 of the bearing housing 40 on the side of the tank 10 visible in these figures, so that the drive shaft reaches a motor 70 and can be driven thereby, passing through the plate 43b of the bearing housing 40. On the other side of the tank 10, the plate 43b may have no aperture therethrough as shown in FIG. 10 (or a water-tight cap or other cover may be provided over the plate 43) and the end of the drive shaft 38 may be contained within the bearing housing 40. Each bearing housing 40 is therefore fixedly mounted on the tank 10 and extends into the tank 10, through a side wall of the base 102. Each bearing housing 40 is arranged to rotatably receive a portion of the drive shaft 38. In the embodiment shown, each bearing housing has a portion 41, which is cylindrical in the embodiment shown in the drawings, extending around the portion of the drive shaft 38 received therewithin. The portion 41 of the bearing housing 40 may be differently shaped in other embodiments, for example being square in cross-section, and the hole in the side of the base 102 may differ in shape accordingly.

In the embodiment shown, the bearing housings 40 provide the only mountings for the conveyer 30, and serve to locate the conveyer 30 with respect to the tank 10. Having no mountings for the conveyer 30 other than the bearing housings 40 inside the tank 10 may help to keep the tank 10 free from brackets and the like which could impede cleaning. In the embodiment being described, and in many similar embodiments, nothing is fixed to the inside base 102 of the tank 10, unlike in prior underwater treadmill designs, so providing a smoother and more continuous surface for easier cleaning.

The conveyer frame 34 of the embodiment being described comprises a lip 35 arranged to cover a furthest end of the belt 32 from the drum 36, so reducing the risk of any hair, dog lead, paws, fingers, or the like becoming trapped, or any dropped items lost into the base 102 (e.g. pulled downwards by the rotating belt 32). A second lip 37 arranged to cover the end of the belt 32 closest to the drum 36 for the same purpose is also provided in this embodiment. The lips 35, 37 may also reduce the risk of an item jamming or blocking movement of the belt 32.

In the embodiments being described, the conveyer 30 as a whole is arranged to be moveable, e.g. for cleaning, repair and maintenance. In particular, the conveyer 30 is arranged to be rotated around the axis of the drive shaft 36. The end region (marked by arrow A in FIG. 2) of the conveyer 30 furthest from the drum 36 is arranged to be lifted, pivoting the conveyer 30 around the drive shaft axis so as to make the underside of the conveyer 30 and the interior of the base 102 accessible.

In the embodiments being described, the drive shaft 38 may not be separable from the drum 36. As the drive shaft 38 is often longer than the tank 10 is wide, relatively large holes in the sides of the base 102 may be needed to allow the conveyer 30 to be inserted from inside the tank 10, at an angle, and then straightened and secured in position.

In the embodiment being described, the drive roller shaft 38 protrudes outside the tank 10 into a gearbox (not shown), so relatively large clearance holes are provide to allow the conveyer 30 to be manoeuvred at an angle into the tank 10 to keep the ends of the drive roller shaft 38 clear inside, then it is straightened up as the shaft is fed through the hole in the side of the tank 10. The bearing blocks 40 can then be slid onto the drive roller shaft 38 from the outside of the tank 10, via the same holes, and may serve to plug the holes.

Whilst the plates 43 of the bearing housings 40 (which may be inserted from outside the tank 10) may serve to seal these holes, accurately aligning the conveyer 30 within the tank 10 may be non-trivial. In the embodiment being described, a pair of blocks 50 is provided—one block 50 on each side of the drum 36, and mounted on the conveyer frame 34. The blocks 50 may be referred to as alignment blocks, as they may serve to facilitate alignment of the conveyer 30 within the tank 10 by engaging with the bearing housings 40. The cooperating shapes of the blocks 50 and bearing housings 40 may therefore be used to ensure that the conveyer 30 is correctly located. The alignment blocks 50 may be used to locate the conveyer 30, and more specifically the drum 36, longitudinally and vertically within the tank 10 by engaging with the bearing housings 40. In particular, an inner, aperture, surface 54 of each block 50 is arranged to fit around an outer surface 44 of the part 41 of the bearing housing 40 extending into the tank 10. These surfaces 44, 54 are both circular in cross-section in the embodiment shown in the figures, but may be of different cooperating shapes (e.g. rectangular) in other embodiments. The blocks 50 are fixedly mounted on the conveyer frame 34, such that they cannot rotate with respect to the conveyer 30.

In the embodiment shown, each block 50 has a body 52 made of a firm, resilient material (e.g. various plastics) and is substantially rectangular (e.g. square) in shape. Each block 50 has an aperture 54 through the larger (square/rectangular) faces of the body 52. The aperture 54 of the embodiment shown is generally circular, with a cut-away portion providing a side opening. The drive shaft 38 of the drum 36 passes through the apertures 54. A portion 41 of each bearing housing 40 is also arranged to pass through its respective aperture 54. The inner surface of the aperture 54 is arranged to provide smooth contact with the bearing housing outer surface 44, so holding the conveyer 30 in place within the tank 10. Each block 50 comprises a bolt 56 passing through the portions of the block on either side of the side opening to the aperture 54. The bolt 56 can be tightened so as to constrict the aperture 54, or loosened so as to allow the aperture 54 to expand. Once the conveyer 30 is in place, the bolts 56 may therefore be tightened so as to grip the conveyer 30 more firmly in place within the tank 10. In various embodiments, spring washers or similar may be used to provide a consistent clamping force for the blocks 50 onto the bearing housing mating surface 44.

The blocks 50 are therefore both adjustable between a first configuration and a second configuration. In embodiments in which the portion 41 of the bearing housing 40 extending into the tank 10 is not cylindrical, rotation of the conveyer 30 with respect to the tank 10 may be prevented by the interaction of the block 50 with the bearing housing 40 in both configurations. In the embodiment shown, with cylindrical bearing housing portions 41, in the first configuration, the aperture 54 is sized to provide a low-friction, sliding fit with an outer surface 44 of the cylindrical portion 41 of the respective bearing housing 40. Rotation of the block 50 with respect to the bearing housing 40, and therefore of the conveyer 30 with respect to the tank 10, is therefore not impeded by the blocks 50 in the first configuration. In the second configuration (i.e. after tightening of the bolts 56 in the embodiment shown) the aperture 54 is restricted so as to grip the outer surface 44 of the cylindrical portion 41 of the respective bearing housing 40. Rotation of the block 50 with respect to the bearing housing 40, and therefore of the conveyer 30 with respect to the tank 10 is therefore impeded by the blocks 50 in the second configuration.

In the embodiment being described, the bearing housings 40 are each arranged to be inserted into the tank 10 from outside, through respective apertures in the lower portion 102 of the tank frame 100, once the conveyer 30 is in position. The apertures are sized to be a close fit around the cylindrical portion 41 of the respective bearing housing 40, to hold the bearing housing 40 in place. The cylindrical portion 41 of the respective bearing housing 40 passes through the respective wall of the tank 10 and into the aperture 54 of the respective alignment block 50. The alignment block 50 may then be tightened to grip the bearing housing 40. The bearing blocks 50 are therefore adjusted to 'clamp' onto the bearing housings 40 to provide the desired resistance.

The treadmill 1 of the embodiment being described is generally assembled by insertion of the conveyer 30 (with the drive shaft, belt 32 and alignment blocks 50 etc. in place) into the tank 10 as a single unit—the interaction of the alignment blocks 50 with the bearing housings 40 may facilitate accurate location of the conveyer 30 within the tank 10. The conveyer 30 may be removed from the tank 10 if the belt 32 needs replacing, and then replaced in the tank with the new belt 32. The bearing housings 40 may be removed from outside the tank 10 to facilitate removal of the conveyer 30 from the tank 10, and then reinserted from the outside when the conveyer 30 is replaced. For cleaning or other maintenance, the conveyer 30 may be lifted/rotated without removing it from the tank 10.

The skilled person would appreciate that a mechanism for reducing the chance of the conveyer 30 falling back down, once the conveyer 30 has been lifted, and potentially trapping hands and/or tools underneath, may be desirable.

In various embodiments, the pair of adjustable blocks 50 as described above may be used for this purpose. In alternative or additional embodiments, alternative or additional braking means, e.g. springs, chocks or stops, may be used instead of, or as well as, the blocks 50 described herein. For example, in various embodiments a treadmill control interface (not shown) may be provided (for example to allow treadmill speed to be adjusted), and may be slidably mounted on one of the rails 104 along the top of the tank 10. The slidable mount for the control interface may also serve as a chock or stop, so having a dual purpose—for example, when the conveyer 30 is in the raised position, the control mounting may be slid along the top side rail 104 and clamped in position adjacent to the raised treadmill, thus preventing the conveyer 30 from being unintentionally lowered/falling. Spring washers or similar may be used to provide a clamping force for holding the control mounting onto the rail 104.

In the embodiments using adjustable blocks 50 described herein, the apparatus 1 comprises a pair of blocks 50 fixedly mounted on the conveyer frame 34. Each block 50 has an aperture 54 therethrough arranged to receive a portion 41 of a respective bearing housing 40 and portion of the drive shaft 38. The inner surface of the aperture 54 provides a smooth, cylindrical, contact surface for the smooth, cylindrical outer surface of the portion 41 of the bearing housing 40. In various embodiments, each block 50 is arranged to be tightened when the respective bearing housing 40 is first inserted into the tank 10. The aperture 54 is sized to allow easy entry for the bearing housing 40 when pushed through the tank wall 102, and then to be tightened to grip the bearing housing 40. In use, this grip may provide some resistance to rotation of the conveyer 30, so allowing the conveyer 30 to be lifted/rotated by a user when a force above a threshold is applied. In various embodiments, the weight of the conveyer 30 may be arranged such that (i) the weight is insufficient to cause rotation of the conveyer 30 without an additional force in raised positions, such that it is locked in place until actively rotated by a user, or (ii) the weight of the conveyer 30 is sufficient to cause rotation of the conveyer 30 without an additional force in raised positions, but by a relatively small margin such that the resultant rotation is slow, and can easily be interrupted by a user if desired. For the same implementation, situation (i) may apply for some rotation positions and situation (ii) may apply for other rotation positions.

In such embodiments, the blocks 50 may therefore only be adjusted on installation, and optionally during maintenance or repair, e.g. if the blocks have worn and need to be tightened further to maintain the desired gripping force. The blocks 50 may not be loosened and tightened for each rotation, e.g. for cleaning, as the conveyer 30 can still be moved with the blocks 50 tightened, provided a force above a suitable threshold is applied. Each block 50 is therefore adjustable between a first, non-gripping, configuration (in which bearing housing insertion is facilitated) and a second, gripping, configuration (in which the bearing housing 40 is gripped). In some embodiments, the first configuration may provide a low-friction, sliding fit with the outer surface 44 of the cylindrical portion 41 of the respective bearing housing 40, so allowing rotation of the conveyer 30 around the axis of the drive shaft 38/with respect to the tank 10. Alternatively, it may be looser, not providing a sliding fit—in such embodiments, tightening the block 50 to the second configuration may also correct alignment of the bearing housing 40 with respect to the conveyer 30. In alternative embodiments, rotation of the conveyer 30 may not be reasonably possible (i.e. the force required would be unreasonably large) in the gripping configuration. In such embodiments, each block 50 may be described as being adjustable between a first, "unlocked", configuration and a second, "locked", configuration. In such embodiments, a user may tighten the alignment blocks 50 (to the second configuration) after raising the conveyer 30, and loosen the alignment blocks (to the first configuration) when it is desired to lower the conveyer 30.

As described above:

In the first configuration, the aperture 54 is larger than in the second configuration, and may be sized to provide a low-friction, sliding fit with the outer surface 44 of the cylindrical portion 41 of the respective bearing housing 40, so allowing rotation of the conveyer 30 around the axis of the drive shaft 38/with respect to the tank 10, whereas In the second configuration, the aperture 54 is restricted to grip the outer surface 44 of the cylindrical portion 41 of the respective bearing housing 40, so restricting/impeding, or even preventing, rotation of the conveyer 30.

The grip exerted by the block 50 may be enough to prevent rotation of the conveyer 30 under its own weight and/or under the application of a relatively small external force, in some, or all, positions. If not, the grip may still slow the rotation of the conveyer 30, potentially providing enough time and warning for the conveyer 30 to be righted and/or to avoid injury or trapping of tools or the like. The grip may facilitate lowering of the conveyer 30 in a controlled manner.

Optionally, in embodiments with the second configuration being a "locked" configuration, the aperture 54 may be adjusted to an intermediate configuration, between the first and second configurations, to reduce grip as compared to the "locked" configuration whilst still providing some resistance to rotation, for lowering.

In the embodiment shown in the drawings, the block is adjusted by means of a bolt or screw 56. The adjustable bolt 56 provided across the gap allows a user to tighten and loosen the block 50 for adjustment between the first and second configurations. Other tightening means may be used in other embodiments. In the embodiment shown in the figures, the bolt 56 is only accessible from the underside of the conveyer 30, so allowing the conveyer 30 to be held in place by tightening the blocks 50 after raising the conveyer, and allowing the blocks 50 to be loosened again for lowering. In other embodiments, the tightening means provided may be accessible from a different position, and/or may be remotely controllable.

In the embodiment shown in the drawings, a cross-section of the aperture 54 of each block 50 in a plane perpendicular to the drive shaft 38 comprises a circle with a gap. The bolt 56 is arranged across the gap and can increase or reduce the gap, so increasing or reducing aperture diameter for the circular part of the aperture. The increasing or reducing of the aperture size may be referred to as loosening or tightening the block 50. The blocks 50 may therefore function in a fashion equivalent to a brake drum; gripping the outside of the fixedly-mounted bearing housing 40 and thereby impeding rotation of the conveyer 30.

In the embodiments being described, the hydrotherapy apparatus 1 further comprises a pair of seals 60. Each bearing housing 40 is arranged to accommodate at least a part of a seal 60 such that the portion of the drive shaft 38 extending into the bearing housing 40 passes from a wet zone (the inside of the tank 10) including the conveyer 30 to a dry zone (outside of the tank 10). The seal 60 provides a watertight, rotating fit to the outer surface of the shaft 38. Each seal 60 may be a PSS Shaft Seal, or the like.

The bearing housing 40 comprises a bearing 45, for example comprising one or more rings of ball bearings as shown in the embodiment pictured in the figures. In the embodiment being described, the seal 60 lies between the wet zone and the bearing 45, so keeping the bearing 45 (and any lubricant, e.g. oil) in the "dry" zone, i.e. not in contact with the liquid used to fill the tank 10 in use.

In the embodiment being described, each shaft seal 60 comprises two parts, 46, 60. Half of each seal 60 is assembled onto a respective region of the drive shaft 38 (generally before placing the drive shaft 38 within the tank). A mating half 46 of each seal is fitted onto the inner face of the bearing housing 40, effectively becoming a part of the bearing housing 40, and so providing the inner surface of the cylindrical aperture 42 through the bearing housing 40. The completed seal 60 is therefore formed when the two parts 46, 60 engage. The parts 46, 60 of the seal rotate relative to each other, as one is mounted on the shaft 38 and the other on the tank 10.

The hydrotherapy apparatus 1 comprises a motor 70, which, in the embodiment being described, is mounted to the outside of the tank 10, and on one side of the tank 10 adjacent an end of the drive shaft 38. The motor 70 is arranged to drive the drive shaft 38 by connection to a portion of the drive shaft in the dry zone, optionally via a gearbox—the gearbox and/or motor 70 can therefore be kept dry, on the far side of the seal 60 from the drum 36. Locating the motor and optional gearbox 70 in a dry zone may allow convenient access for maintenance, for example simply by removing a cover 114.

A shaft-mounted gearbox (not shown) is used in the embodiment being described to adjust conveyer speed. In alternative embodiments, a shaft-mounted gearbox may not be used; indeed, completely different methods of transmission and gearing may be used, such as mounting the motor underneath the conveyer 30, or at an end of the tank 10 (e.g. under or within the ramp 28, 29), and/or e.g. sprockets and transmission belts may be used, or the conveyer 30 may be arranged to operate at only a single speed. The skilled person would appreciate that any suitable drive mechanism may be use in various embodiments, and that the example described herein is not intended to be limiting.

Figure 19:
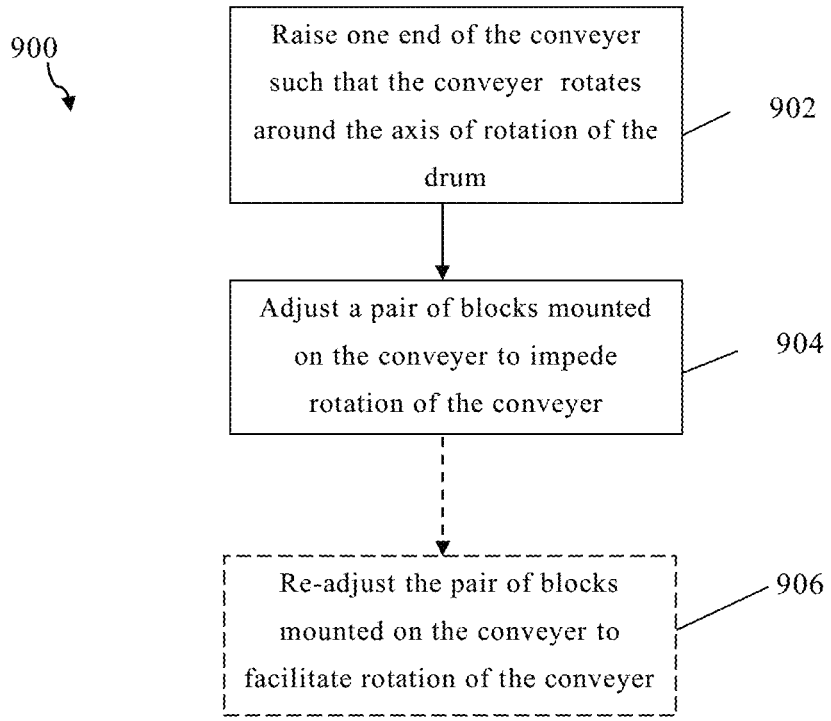
FIG. 19 illustrates a conveyer movement control method of various embodiments.

A method 900 of controlling movement a conveyer 30 of a hydrotherapy apparatus 1 of some embodiments, which may be as described above, is depicted in FIG. 19. The final step 906 of this method 900 may be particularly relevant to embodiments with a "locked" configuration. The hydrotherapy apparatus 1 comprises a conveyer 30 comprising a belt 32 and a drum 36 with a drive shaft 38 having an axis of rotation and being located within a tank 10, wherein the belt 32 is arranged to be driven by rotation of the drum 36. A pair of adjustable blocks 50 is fixedly mounted on the conveyer 30, one block on either side of the drum 36.

The method 900 comprises raising 902 one end (A) of the conveyer 30 such that the conveyer 30 rotates around the axis of rotation of the drum 38. The end of the conveyer 30 may be raised in any suitable way, for example that described below. Once the conveyer 30 has been rotated to a desired position, the pair of blocks 50 can then be adjusted 904 to impede rotation of the conveyer 30. The blocks 50 are fixedly (i.e. non-rotatingly) mounted on the conveyer 30 (and more specifically on a frame 34 of the conveyer 30). Each block 50 is arranged to grip a bearing housing 40 fixedly mounted on the tank 10 so as to impede rotation of the conveyer 30 relative to the tank 10. The blocks 50 may then be adjusted again 906 to release the grip on the bearing housings 40, so facilitating further rotation of the conveyer 30 when desired—e.g. once cleaning or maintenance is complete and the conveyer 30 is to be repositioned for use (e.g. lowered). This readjustment 906—e.g. loosening the blocks 50—may not be performed in some embodiments.

In alternative embodiments, the blocks 50 may not normally be adjusted after lifting the conveyer 30—the blocks 50 may be assembled and adjusted on installation so as to provide a desired amount of resistance to rotation in use. In such embodiments, the blocks 50 may be adjusted only if or when their grip reduces, e.g. due to wear, to maintain the desired amount of resistance to rotation.

On assembly of the treadmill 1, once the bearing housings 40 are inserted into the alignment blocks 50, the corresponding surfaces 44, 54 of each are in contact. The adjustment means (e.g. bolt 56) of the alignment blocks 50 can then be adjusted so as to create the desired amount of resistance, so as to restrict the otherwise-free rotation of the conveyer 30. The level of resistance may be set such that a person could raise or lower the conveyer 30 against the resistance, but, if released, the conveyer 30 would not fall/immediately rotate to its lowest position—it may gradually lower under its own weight. This use of the alignment blocks 50 may allow the costly and problematic hydraulic struts commonly used to assist lifting the conveyer 30 for cleaning to be eliminated.

The method 900 may therefore be performed on installation, and optionally only on installation. In other embodiments, the adjustment means (e.g. bolt 56) of the alignment blocks 50 may be accessible without raising the conveyer 30, so the raising step 902 may not need to be performed before adjusting 904 the blocks 50.

In the embodiment shown in the figures, the hydrotherapy apparatus 1 comprises an actuator 200 arranged to facilitate raising and lowering of the conveyer 30. The conveyer 30 is raised and lowered by rotation about the drive shaft axis 38, which is located in one end region of the conveyer 30 (with the drum 36).

Figure 20:
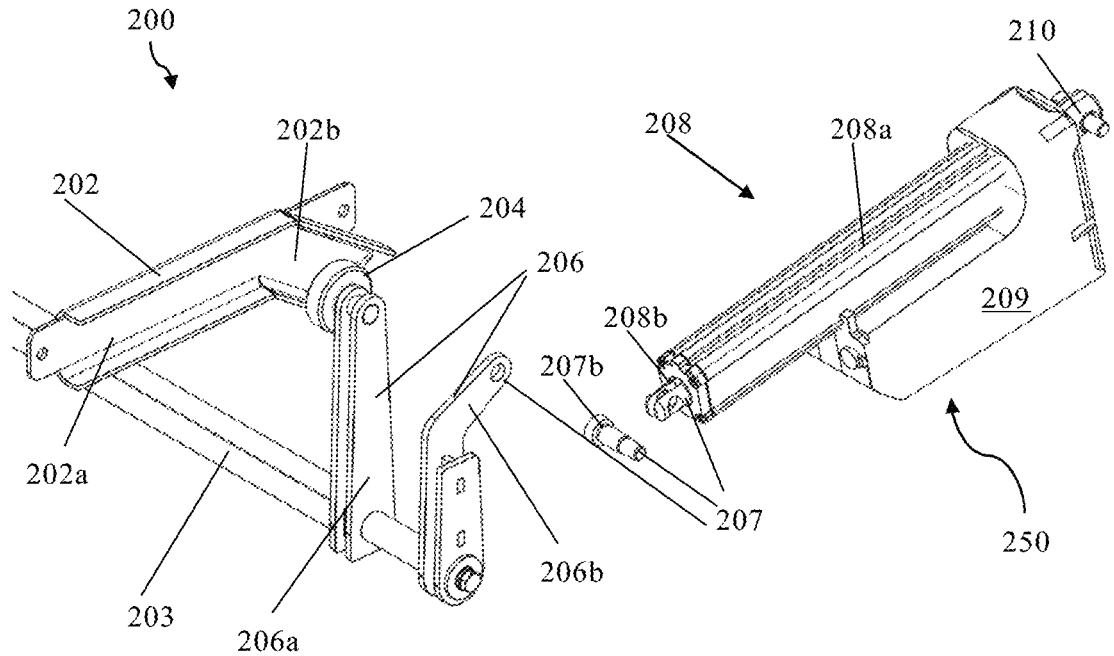
FIG. 20 shows an exploded perspective view of the actuator.

The actuator 200, which is shown in isolation in FIG. 20, comprises a channel 202. The channel 202 is arranged to be mounted on an end region A of the conveyer frame 34 furthest from the drum 36, and is oriented perpendicular to the axis of the drum 36. The channel 202 comprises a first portion 202a and a second portion 202b which is angled with respect to the first portion. The first and second portions 202a, 202b are contiguous, so providing a single channel 202 with a bend. In alternative embodiments, a smooth curve may be used instead of two straight portions with a bend therebetween. In the embodiment shown, the channel 202 is formed from a single piece of flat sheet, with a lug welded thereto to facilitate fixing to the frame of the conveyer 30. The corner, or bend, is created by two flat faces joining, so may facilitate manufacture as compared to a curved component by avoiding a potential need to weld in an additional curved corner section. The roller 204 comes into contact with the flat faces to either side of the corner.

The first portion 202a of the channel 202 is oriented parallel to the belt 32 in the embodiment shown—the first portion 202a may be differently angled with respect to the belt 32 in other embodiments. In the embodiment shown, the belt 32 of the conveyer 30 is arranged to slope slightly upwards towards the drum 36 in use; the first portion 202a of the channel 202 therefore also slopes slightly upwards towards the drum 36 in use. In embodiments in which the conveyer 30 is arranged to have a horizontal upper surface (belt 32) in use, the first portion 202a of the channel 202 may be angled with respect to the belt 32, rather than parallel to it, such that the first portion 202a of the channel 202 also slopes slightly upwards towards the drum 36 in use.

The second portion 202b is angled downwards with respect to the first portion 202a. The second portion 202b is angled downwards towards the drum 36. The second portion 202b is closer to the drum 36 than the first portion 202a. The angle between the first and second portions is between 25° and 65°, and more particularly is around 45°, in the embodiment shown.

The first portion 202a is longer than the second portion 202b in the embodiment shown, and more particularly has a length of two to three times that of the second portion 202b.

In the embodiment being described, the first portion 202a serves to incline the conveyer 30 downwards (in a direction away from the drum) during use, thus increasing the effort required during exercise as the user 2 is walking "uphill". The second portion 202 may be occupied by the glider 204 only when the treadmill 1 is not in use, e.g. under maintenance or cleaning conditions when the tank 10 can be drained and the conveyer 30 can be raised to allow access to the tank base.

The actuator 200 comprises a roller, or wheel, 204 arranged to be received within the channel 202. The roller 204 is sized and shaped to be able to roll along within the channel 202. The end of the channel 202 closest to the drum 36 is sized to allow the roller 204 to leave the channel 202 out of the end of the channel (e.g. as the conveyer 30 with the channel 202 thereon is lifted away from the base of the tank 10). The end of the channel 202 furthest from the drum 36 is similarly open in the embodiment shown, but may be closed in other embodiments.

In alternative embodiments, the or each roller 204 may comprise a pair of wheels (or more than two wheels—e.g. three or four), and optionally the multiple wheels may be arranged to grip either side of a track and to roll along that track. The channel 202 may therefore be replaced with a track 202 with a bend between two track portions. In alternative embodiments, the roller 204 may be replaced with one or more sliders arranged to slide along within a bent channel 202, or along a bent track 202, without rotating. As used herein, the term "glider" is intended to cover any element 204 arranged to move along a guide 202, whether or not it rotates during that movement (i.e. to include rollers and sliders).

The channel 202 described herein is therefore an example implementation of a guide 202 (e.g. a channel, track, rail, or the like) which may be used in various embodiments, and the roller 204 is an example implementation of a glider 204 (e.g. a slider or roller). The skilled person would therefore appreciate that, whilst the specific example of a roller 204 moving within a channel 202 is described herein for ease of reference, the actuator 200 could easily be adapted to use different forms of guides 202 and/or gliders 204, without departing from the scope of the invention. The glider 204 is movably received by the guide 202—whether within it, around it, or otherwise on it—in such a way as to be able to move along the guide 202, between first and second portions 202a, 202b thereof.

The roller 204 (or other glider 204 in other embodiments) of the embodiment being described is mounted on a rotatable roller arm 206 (which may be more generally referred to as a glider arm 206 or connector 206). The glider arm 206 is rotatably mounted on the tank 10, and more specifically rotatably mounted on a frame 100 of the tank 10.

In the embodiment shown, the glider arm 206 shown comprises two struts 206a, 206b both fixedly mounted on the same rotatable axis (provided by a shaft 203). In alternative embodiments, the struts 206 may have a different shape, and may therefore be more generally referred to as connectors rather than struts. The term "strut" is used herein for brevity and in light of the shape of these connectors in the specific embodiment pictured, but should not be held to be limiting.

The first strut 206a has the roller 204 mounted thereon. The first strut 206a is straight in the embodiment being described. The second strut 206b is spaced outwardly along the shaft 203 from the first strut 206a in this embodiment, and comprises a bend such that the second strut 206b extends from the shaft 203 parallel to and level with the first strut 206a initially, and then bends towards the drum 36 (at an angle of around 45° from the first strut 206a in the embodiment shown). In alternative embodiments, such as that shown in FIG. 22 onwards, the angle between the two struts 206a, 206b may be different, such that they do not extend from the shaft 203 parallel to each other. In particular, the second strut 206b may be angled away from the first strut 206a by an angle of around 15°, with the second strut 206b angled further on than the first in a clockwise direction, when viewed from next to the treadmill. Such a difference in angle may facilitate more use being made of the full range of movement of the piston 208 described below, potentially allowing the treadmill to be lifted further by the movement of these struts 206.

The actuator 200 of the embodiment being described is powered electrically, and arranged to cause the glider 204 to move along the channel 202. In the embodiment being described, the actuator 200 is located on the same side of the tank 10 as the motor 70. In the embodiment being described, the actuator 200 is electrically powered, having a wired connection to an external power source (e.g. mains electricity). The actuator 200 may be controlled via a treadmill control interface (not shown), arranged to allow a user to select a conveyer position. In other embodiments, the actuator 200 may be differently located and/or differently powered—for example, the actuator 200 might be powered by the motor 70 in some embodiments, and/or might be located on the opposite side of the tank 10 from the motor 70.

The actuator 200 of the embodiment being described comprises a piston assembly 250. The piston assembly 250 comprises an actuator piston 208. The piston 208 includes a piston body 208a and a piston rod 208b. The piston rod 208b is rotatably connected to the roller arm 206 in one end region thereof, via a connector 207. The piston rod 208b is arranged to move longitudinally with respect to the piston body 208a; moving in and out of the body 208a. In the embodiment shown, the piston rod 208b is connected to the glider arm 206, and in particular to the second strut 206b, and more specifically to an end region of the second strut spaced from the shaft 203, in the embodiment shown. The piston rod 208b is rotatably connected to the second strut 206b by means of a connector 207. The connector 207 comprises a bolt or pin 207b arranged to pass through an aperture in each of the piston rod 208b and the glider arm 206. Alternative or additional connectors 207 may be provided in other embodiments. The piston rod 208b therefore is capable of a range of movement—both longitudinal movement in and out of the piston body 208a, and rotational movement due to the pivotal connection 210.

In alternative embodiments, the actuator 200 may take a different form and may not comprise a piston 208. A different actuator shaft 208, 208b may be used instead of a piston rod 208b in such embodiments. The skilled person would appreciate that any suitable mechanism known to one skilled in the art may be used.

In the embodiment being described, the piston body 208a is mounted on the tank 10 (and more specifically on the frame 100 of the tank 10) in the end region of the piston 208 furthest from the connector 207. The piston body 208a is mounted onto the tank frame 100 by a pivotable connection 210 to a bracket 211 mounted on the lower portion 102 of the frame 100. The piston body 208a is arranged to be able to rotate freely about an axis of the pivotal connection 102, the axis being parallel to the width of the conveyer 30/perpendicular to the length of the conveyer 30 in the embodiment shown. The connection 210 comprises a bolt or pin arranged to pass through an aperture in the bracket 211 in the embodiment shown; other connectors may be used in other embodiments.

An actuator cover 209 covers a motor arranged to drive the piston 208. In the embodiment shown, the cover 209 is mounted on the piston body 208a and the piston body 208a is directly connected to the tank 10. In alternative embodiments, the piston body 208a may be connected to the tank 10 via the cover 209. In the embodiments being described, the piston 208 is electrically driven—a wired connection connects the integrated motor within the actuator cover 209 to an electricity supply such as a mains supply.

In alternative embodiments, the glider arm 206 and piston rod 208b (or other actuator shaft) may be provided by a single component, or by more than two components. The actuator shaft 208, 208b, which may replace the whole of the piston 208 in some embodiments, is coupled to the roller 204—directly or indirectly—and is arranged to move the roller 204 along the channel 202.

In the embodiment shown, the actuator 200/lifting mechanism is at least partially symmetrical about a longitudinal axis perpendicular to the drive shaft 38, in particular comprising a corresponding set of parts (channel 202, roller 204 and roller arm 206) on the opposite side of the tank 10 and level with the set of parts described above. The shaft 203 connects the two sets of actuator parts—in particular having both roller arms 206 mounted thereon such that they rotate together.

In the embodiment being described, a single piston 208 is provided and used to rotate the shaft 203, so rotating both roller arms 206. Two roller arms 206, each with a roller 204 mounted thereon, are attached to the same shaft 203. The second roller arm 206 (i.e. the roller arm on the far side of the tank 10 from the piston 208) may therefore have only the first strut 206a, and not the second strut 206b of the first, as indicated in FIGS. 4 and 5. Two actuator shafts 208 (and indeed two pistons) may be provided in other embodiments—one for each roller arm 206.

In the embodiment being described, the shaft 203 is mounted in a support bock 212, with waterproof seals, on the actuator side of the tank 10. The support block 212 may also be referred to as a pivot block, as it allows rotation of the shaft 203 mounted on it. The shaft 203 passes through the base 102 of the tank 10, such that the piston assembly 250 is located in a dry zone, and the seals provide waterproofing. On the side of the tank 10 opposite the actuator, the shaft 203 is received in a bearing block mounted on an inner surface of the lower portion 102 of the tank 10 (in the wet zone), so avoiding a need for an additional seal. The shaft 203 may be differently mounted in other embodiments—for example, in embodiments with two actuator shafts 208, the mountings for the shaft 203 may be symmetrical.

In alternative or additional embodiments, two pistons 208 may be provided, optionally coupled together to ensure even movement of the two gliders 204. In alternative embodiments, only a single guide 202 and glider 204 may be provided—the skilled person would appreciate that there may be additional constraints on guide 202 and glider 204 design in embodiments with only one to minimise or avoid any unwanted twisting or tilting forces on the conveyer 30, whereas use of two channels and gliders, one on each side of the conveyer 30, may provide a more even force distribution, supporting the conveyer 30 on both sides.

The conveyer 30 is arranged to be rotated around the axis of the drive shaft 38 by the piston rod 208b (or alternative actuator shaft 208b in other embodiments) moving the roller arm 206 such that the roller 204 moves along the first portion 202a of the channel 202 and into the second portion 202b of the channel 202, thereby raising the end region (A) of the conveyer 30 furthest from the drum 36.

In particular, in a first position (e.g. in use of the treadmill) as shown in FIGS. 1, 2, 13 and 16, the upper surface of the belt 32 of the conveyer 30 is horizontal, or angled slightly upwards towards the drum 36, such that the lip 35 at the end of the conveyer 30 furthest from the drum is level with the base 102, or slightly below the base 102, in the region of the door 12. In this first position, the roller 204 is located in an end region of the first portion 202a of the channel 202 furthest from the drum 36. The piston rod 208b may serve to hold the roller 204 in this position in various embodiments, so locking the conveyer 30 in place. The roller arm 206 (and more specifically strut 206a in the embodiment shown) is angled away from the drum 36 in the first position. In this first position, the roller 204 is generally in its lowest (vertical) position (for a tank 10 located on a horizontal surface). In embodiments which offer a position in which the belt 32 is angled slightly upwards towards the drum 36 as well as a horizontal position, the roller 204 is located in an end region of the first portion 202a of the channel 202 furthest from the drum 36 in the angled position, and the roller 204 is located closer to the second portion 202a in the horizontal position. The actuator 200 may be arranged to lock/hold the conveyer frame 34 in either of these positions, as desired.

Figure 14:
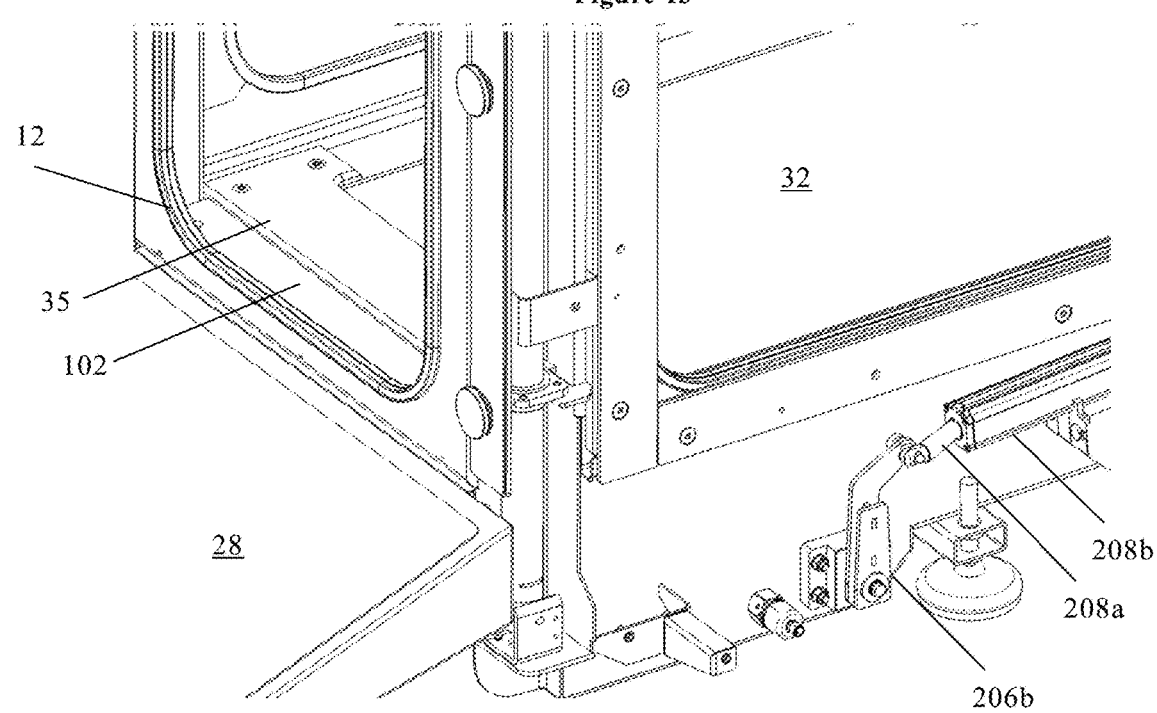
FIG. 14 shows a perspective view of a portion of the hydrotherapy apparatus, showing the actuator in a second position.
Figure 17:
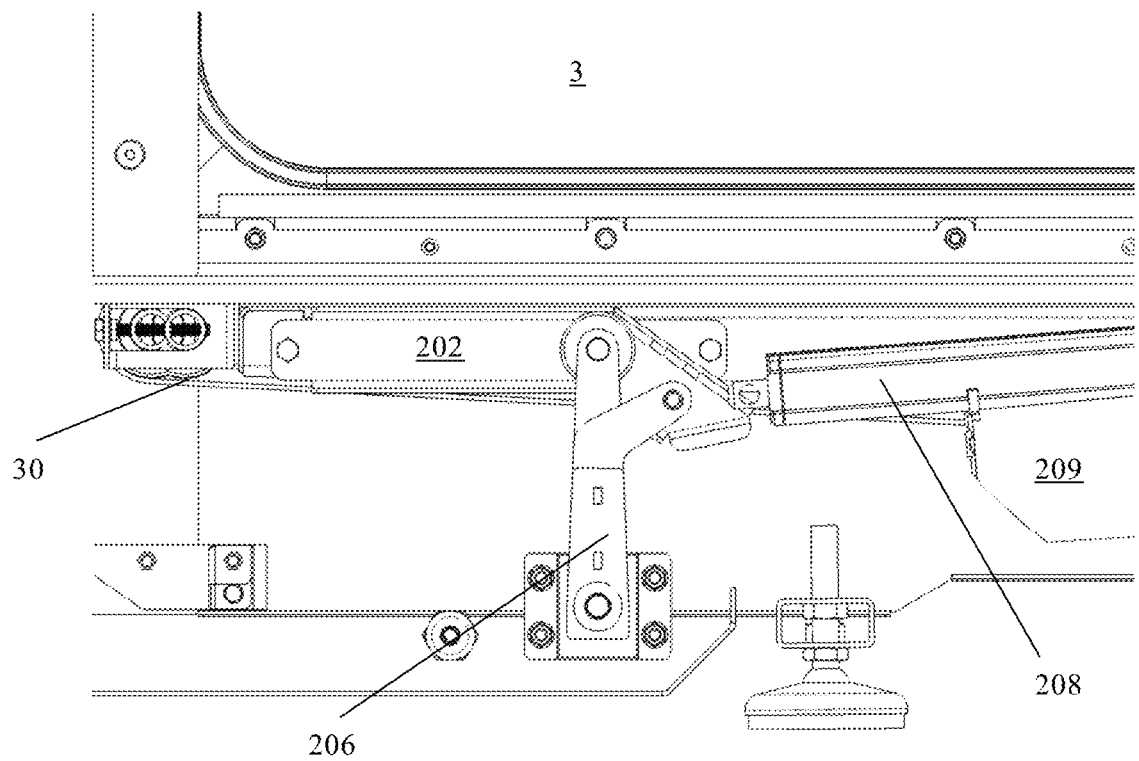
FIG. 17 shows a side view of a portion of the hydrotherapy apparatus, showing the actuator in the second position.

The actuator shaft 208 can then be moved towards the drum 36, pulling the roller 204 along the first portion 202a of the channel 202 and towards the second portion 202b. The conveyer 30 is caused to pivot around the axis of the drive shaft 38, moving the end of the conveyer 30 furthest from the drum 36 upwards. In the second position, as shown in FIGS. 14 and 17, the roller 204 is at the bend between the first and second portions of the channel 202. The roller arm 206 (and more specifically strut 206a in the embodiment shown) is at least substantially vertical in this second position, in the embodiment shown, so holding the roller 204 in its highest (vertical) position. The conveyer 30 is horizontal, or angled slightly downwards towards the drum 36, such that the lip 35 at the end of the conveyer 30 furthest from the drum is slightly above the base 102, in the region of the door 12. The gap between the lip 35 and the base 102 may be sufficient to insert a hand or tool thereinbetween, so as to lift the conveyer 30 further. Alternatively, a handhold or the like in a side of the conveyer frame 34 may be raised above the base 102 so as to be accessible, even if the lip 35 is not fully above the base 102. The actuator 200 may therefore serve to provide access to a gripping point without requiring any apertures, hooks, handles or the likes on the upper surface of the conveyer 30, so potentially facilitating cleaning and/or reducing the risk of trapping or injury. In alternative or additional embodiments, as described below, the second position may be arranged to align components of a second lifting mechanism, to allow further automatic (i.e. non-manual) lifting/rotation of the conveyer 30.

Figure 18:
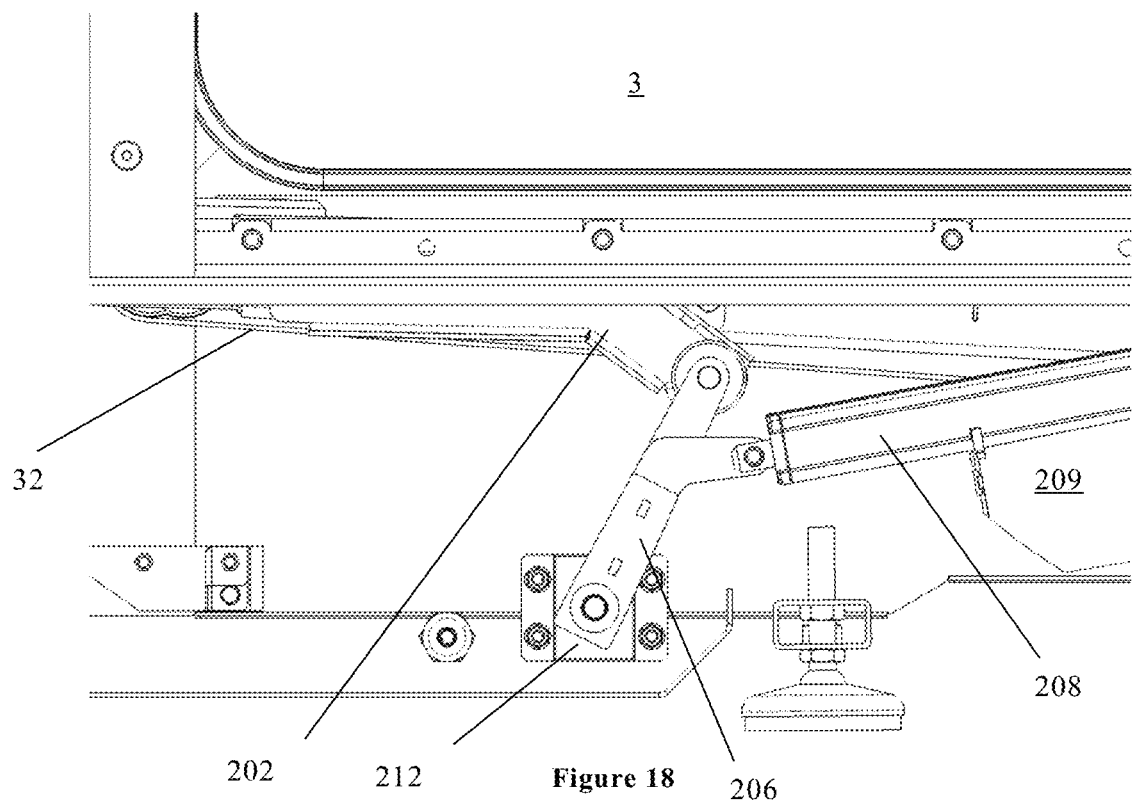
FIG. 18 shows a side view of a portion of the hydrotherapy apparatus, showing the actuator in the third position.

In some embodiments, the actuator shaft 208b may need to pull the roller 204 further into the second portion 202b of the channel to lift the conveyer 30 sufficiently for a gap to be created, providing access to the underside (or for a handhold or the like to be exposed, or to engage a second lifting mechanism, as appropriate), for example towards or to the third position as shown in FIG. 18, in which the roller 204 is located in the far end of the second portion 202b/in a second end region of the channel 204.

The conveyer 30 may then be lifted into a fourth position such as that shown in FIGS. 4 and 5. In the fourth position, the roller 204 is completely free of, and separate from, the channel 202. The channel 202 simply lifts off the roller 204 as the conveyer 30 is lifted further in the embodiment shown.

Figure 13:
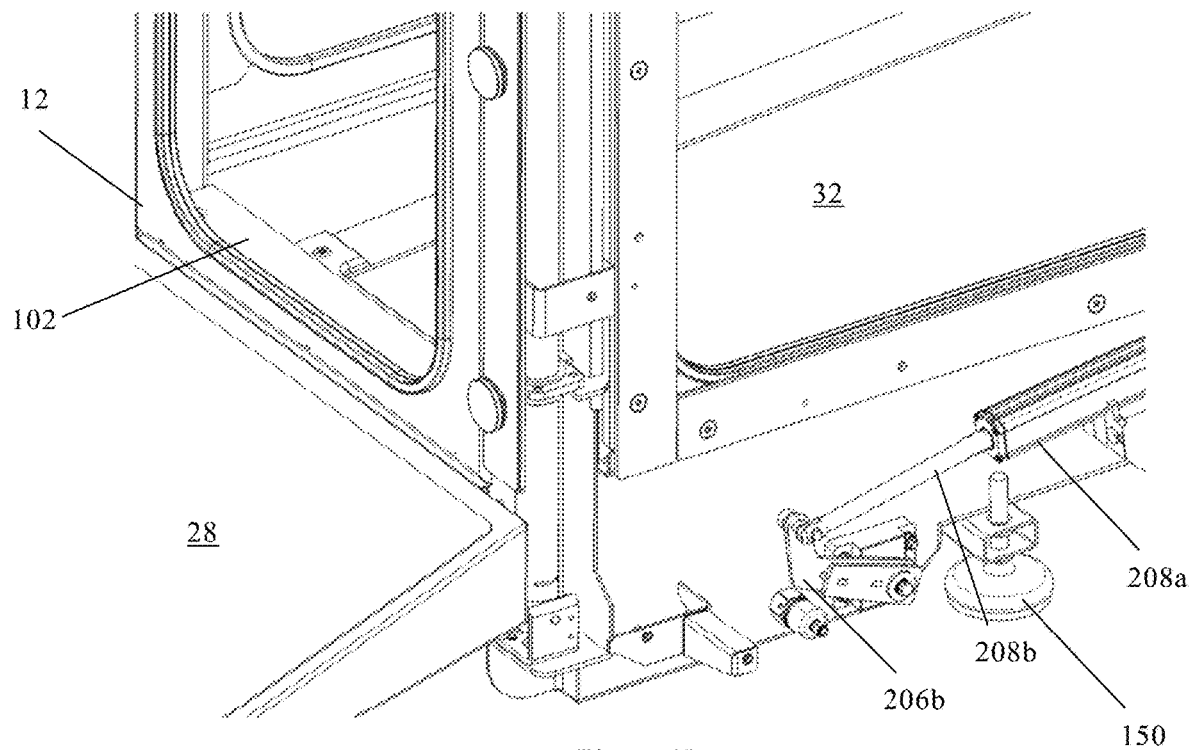
FIG. 13 shows a perspective view of a portion of the hydrotherapy apparatus, showing the actuator in a first position.
Figure 15:
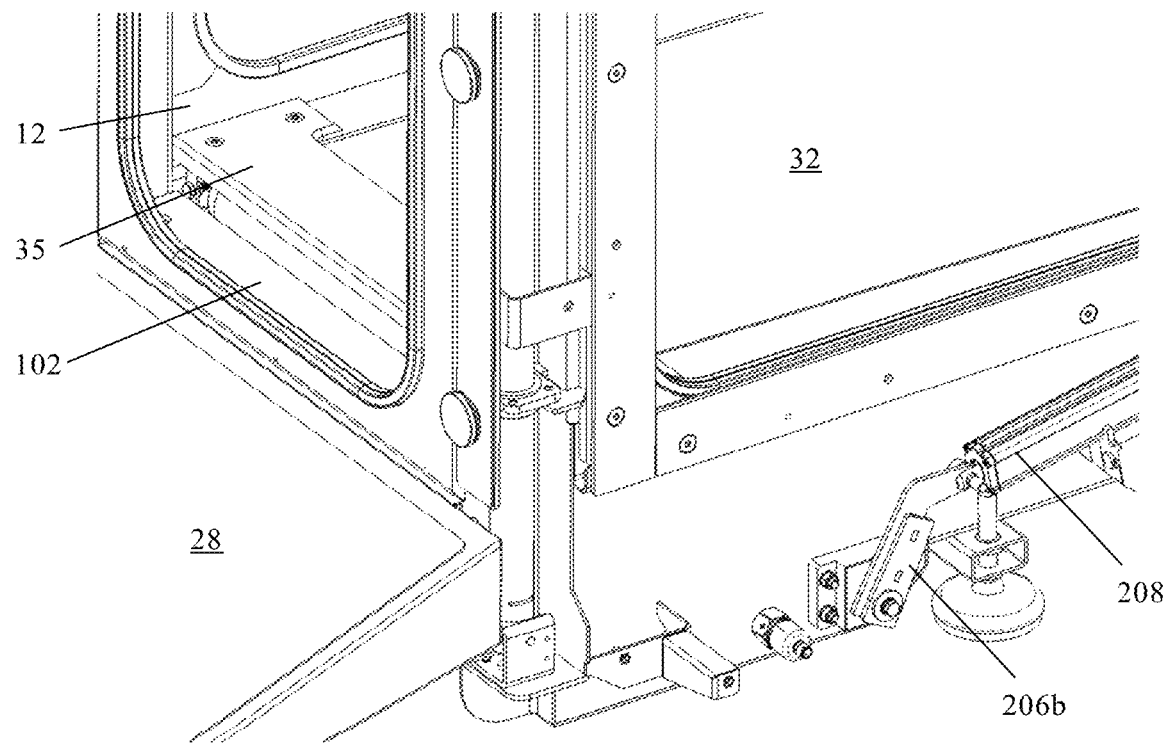
FIG. 15 shows a perspective view of a portion of the hydrotherapy apparatus, showing the actuator in a third position.

In the Figures, the channel 202 and roller 204 are not shown in FIGS. 13 to 15 in order to show the movement of the roller arm 206 and the piston 208 more clearly. The first strut 206a of the roller arm 206 is also not shown. The bolt 207b serves to rotatably connect one end region of the roller arm 206, and more specifically of the second strut 206b of the roller arm 206, to an adjacent end region of the piston rod 208b. In the first position, as shown in FIG. 13, the roller arm 206 is angled towards the end of the conveyer 30 furthest from the drum 36. The roller arm 206 is prevented from moving the roller 204 any closer to the end of the conveyer 30 furthest from the drum 36 by the piston rod 208b, which is at its maximum displacement in that direction in the first position, in the embodiment shown. The roller 204 is therefore unable to slip out of the open end of the first portion 202a of the channel 202, as the piston 208 limits its movement.

Figure 16:
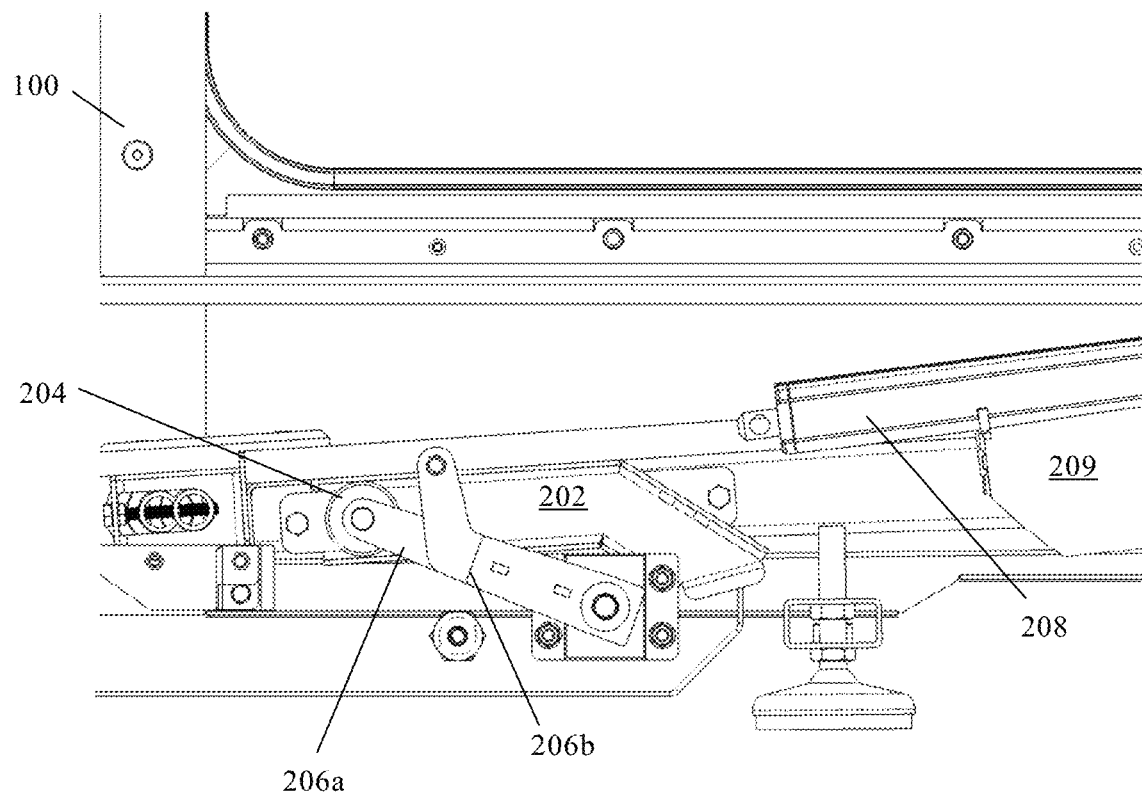
FIG. 16 shows a side view of a portion of the hydrotherapy apparatus, showing the actuator in the first position.

FIG. 16 illustrates the same position, but with the piston rod 208b shown disconnected from the roller arm 206, so as to show the channel 202 and roller 204 more clearly. In reality, the piston rod 208b would remain connected to the roller arm 206 in use. In the embodiment shown in FIGS. 13 and 16, the belt 32 is angled slightly downwards away from the drum 36 in the first position—the channel 202, which is parallel to the belt 32, is therefore also angled downwards away from the drum 36. The roller 204 is therefore in its lowest position, as well as in its position furthest from the drum 36, in the first position.

The actuator 200 may therefore serve to hold the conveyer 30 in the first position in use. In particular, for the conveyer 30 to pivot upwards about the drive shaft axis, the roller 204 would need to move upwards along the channel 202, pushing the conveyer 30 upwards and the piston rod 208b back towards the drum 36/further within the piston body 208a. If the piston 208 is locked in position, the roller arm 206 cannot pivot towards the drum 36, so the roller 204 is held in its lowest position, holding down the conveyer 30. Even if the piston 208 is not locked in position, in the absence of a force applied via the piston rod 208b to move the roller 204, the weight of the conveyer (and potentially of water and a user 2, in use) may tend to hold the roller 204 in the first position within the channel 202 in some embodiments. The piston rod 208b can then be moved/retracted towards the drum 36, causing the roller 204 to move along the channel 202 towards the drum 36. As the roller 204 is mounted on a pivotably mounted roller arm 206 of fixed length, moving towards the drum 36 also moves the roller 204 upwards as the roller arm 206 rotates. The movement therefore tilts the conveyer 30, more specifically moving the end of the conveyer 30 furthest from the drum 36 upwards.

In the embodiment being described, the channel 202 and roller arm 206 are designed such that, when the roller arm 206 (and more specifically the first shaft 206a of the roller arm 206) is perpendicular to the base of the tank 10 (i.e. in a vertical position in the tank orientation shown), the roller 204 is positioned directly above the pivot mounting of the roller arm 206 and also on the bend/at the corner between the first portion 202a and the second portion 202b of the channel 202. This is the second position, as shown in FIGS. 15 and 17. The roller arm 206 therefore pivots backwards from its forward-most position to a more central position as the conveyer 30 is moved from the first position to the second position.

In the embodiment being described, the conveyer 30 is arranged such that, in the second position, the conveyer 30 is horizontal/parallel to the base of the tank 10. In some embodiments, the lip 35 may be vertically level with the base 102 in the second position. In other embodiments, the lip 35 may rise above the base 102 in the second position, so facilitating gripping the lip 35 so as to lift the conveyer 30 further.

The piston rod 208b can then be further moved/retracted towards the drum 36, causing the roller 204 to move further along the channel 202 towards the drum 36, and more specifically to move into and along the second portion 202b of the channel 202, which is angled downwardly towards the drum 36. As the roller arm 206 is now rotating backwards from its central position, the roller 204 is pulled downwards and backwards by the continued rotation, so pushing the conveyer 30 further upwards into the third position by its interaction with the sloped channel 202, as shown in FIGS. 15 and 18. In the third position, the lip 35 of the conveyer 30 is above the base 102 of the tank 10, so providing easy access for gripping the end (A) of the conveyer 30 furthest from the drum 36 (or aligning a second lifting mechanism, as described below). The end of the conveyer 30 can therefore be lifted further with ease, and optionally "locked" in a raised position in some embodiments, for example by using adjustable blocks 50 as described above.

In the third position, the roller 204 is located in an end region of the channel 202. The channel 202 is arranged such that further pivoting of the conveyer 30 causes the roller 204 to slide out of the channel 202. The piston 208 holds the roller arm 206 in the third position once the conveyer 30 is lifted beyond its third position, in the embodiment shown, as indicated in FIGS. 4 and 5. In other embodiments, the piston 208 may continue to move, optionally pulling the roller arm 206 further towards the drum 36 (as seen by comparing FIGS. 36 and 37, noting that the channel 202 is not visible in FIG. 37 as this has been raised out of the area shown)—the piston 208, and/or other movements relating to a second lifting mechanism, may then return the roller arm to the third position when the conveyer movement changes direction. When the conveyer 30 is then lowered (e.g. after repair or cleaning is complete), the roller 204 is positioned to smoothly re-enter the channel 202 when the conveyer 30 reaches its third position. The roller 204 enters the channel 202 and the weight of the conveyer 30, the force of a person moving the conveyer, and/or urging by the actuator 200, moves the roller 204 along the channel 202, towards the second position and onwards to the first position. In the embodiment being described, the weight of the conveyer 30 and/or a force applied by a user urges the roller 204 to the second position, and the actuator 200 is then actuated to cause the roller 204 to pull the conveyer 30 down into the first position. In some embodiments, the weight of the conveyer 30 may be sufficient to cause it to move back to the first position without assistance, but braking resistance or the like may mean that an additional force is required in some embodiments. The conveyer 30 is then restrained in the first position by the roller 204 in the channel 202—this locking of the conveyer 30 in position may be important in some embodiments as, for example, on filling the tank 10, the pressure of the water may otherwise lift the conveyer 30.

As the conveyor 30 is lowered back towards the base of the tank 10, onto the roller 204, the roller 204 comes into contact with the channel 202—this contact may help to control, and optionally to slow, the downward movement, potentially reducing the risk of fingers becoming trapped under the treadmill conveyer 30. It will be appreciated that the traditional gas struts for raising and lowering treadmills are generally less effective at the lowered position, offering a compromise to be more efficient mid-stroke to support the weight—the actuator 200 disclosed herein may therefore improve safety.

The roller 204 therefore enters the channel 202 and is urged along the channel 202, back to the first position. The actuator 200 may therefore urge the conveyer 30 back into the first position under the weight of the conveyer 30 (and optionally also any downward force applied by a person lowering the conveyer 30), even if the actuator shaft 208 is not used to exert a force on the roller arm 206 in some embodiments.

In the embodiments being described, the or each actuator shaft 208 is a fixed-length arm, for example being made of a single piece of metal. The actuator shafts 208 are therefore not gas struts, and do not have the maintenance and longevity issues associated with gas struts in treadmill applications.

FIG. 22 illustrates a second hydrotherapy apparatus 1 comprising a tank 10. The hydrotherapy apparatus 1 is generally as described above (and the same reference numerals are used for corresponding components), but with modifications to the treadmill lifting mechanism as described below. In particular, components of the actuator 200 have been reinforced—the two struts 206a, 206b and the pivot shaft 203 have been made thicker, so allowing a larger weight to be borne more easily—and an additional, second, lifting mechanism has been added.

In the embodiment shown, the larger pivot shaft 203 is arranged to be fed through from within the conveyer frame for ease of construction, and a bearing 203a is provided which is slid onto the shaft 203 from the outside, so holding it in place. The support block 212 shown for the embodiments described with respect to the earlier figures may therefore be modified or replaced as appropriate to accommodate this larger bearing. In the embodiment shown, the support block 212 is round and supports and secures the bearing 203a. The bearing 203a may be integral with the support block 212 in some embodiments.

In addition, the second lifting mechanism is arranged to lift the conveyer 30, and in particular the end region (A) of the conveyer frame 34 furthest from the drum 36, further upwards so as to raise that end of the conveyer 30 further above the horizontal position, e.g. for cleaning (it will be appreciated that dog hair and the like should be removed at regular intervals). This may reduce or avoid the need to insert a hand or tool into a handhold or gap so as to manually lift the conveyer 30.

In the embodiment being described, the glider 204 and guide 202 described above are used to lift the end region (A) of the conveyer frame 34 furthest from the drum 36 to a position just above the horizontal (and may therefore be described as a first lifting mechanism), and the second lifting mechanism (described below) is arranged to take over as the glider 204 leaves the guide 202, and continue lifting beyond that point. In alternative embodiments, all mechanised lifting may be provided by the lifting mechanism described with respect to the later figures, and/or a different lifting mechanism may be used for the first stage of the lifting instead of the glider and guide (the glider 204 and guide 202 may not be present).

In the embodiment being described, the same actuator shaft 208 is arranged to power the second lifting mechanism as the glider 204 and guide 202. The first and second lifting mechanisms may therefore be thought of as parts of the same lifting mechanism. The same actuator shaft 208 may also be used to lower the end region of the conveyer frame 34 furthest from the drum 36 between different positions below the horizontal in use, to increase treadmill slope and hence intensity of exercise. In the embodiment being described, the actuator shaft 208 is a piston 208 and is arranged such that, when the glider 204 reaches the end of the channel 202 (FIG. 36), the piston 208 has not reached the end of its stroke and can still move further towards the drum 36; the additional portion of the actuator's movement is used to move the second lifting mechanism. In embodiments without a second lifting mechanism, the glider 204 may reach the end of the channel 202 as the actuator shaft 208 reaches the end of its stroke.

The second lifting mechanism comprises a pair of lifting arms 80. One lifting arm 80 is located at either side of the conveyer frame 34 in the embodiment shown. In other embodiments, the lifting mechanism may instead comprise only a single lifting arm 80 (optionally located centrally with respect to conveyer frame width), or more than two lifting arms (e.g. one at each side and a central arm, for a total of three). In the embodiments being described, the or each lifting arm 80 is a fixed-length lifting arm 80, for example being made of a single piece of metal. The lifting arms 80 are therefore not gas struts, and do not have the maintenance and longevity issues associated with gas struts in treadmill applications.

In the embodiment being described, the two lifting arms 80 are rigidly coupled together by a spacer 82. The spacer 82 takes the form of a bar extending between the two, across the width of the conveyer frame 34, in the embodiment shown, although it may take a different form in other embodiments. The spacer 82 serves to prevent relative movement of the two lifting arms 80. It will be appreciated that misalignment of the two arms 80 could cause an undesirable torque on the conveyer frame 34, interfering with smooth lifting. The spacer 82 may also be used as a release handle 82 to move the lifting arms 80 out of engagement with the pins 206c described below, for further movement of the conveyer 30.

The or each lifting arm 80 is rotatably connected to the conveyer frame 34, and in particular to one side of the conveyer frame 34 in the embodiment being described. The rotatable connection 80a may be formed by a bearing. Each lifting arm 80 is arranged to be able to rotate in one plane only; parallel to the side of the tank 10. The rotatable connection 80a is formed at or near a first end of the lifting arm 80, and may therefore be described as being at a first end region of the lifting arm 80. The rotatable connection 80a is formed part way along the length of the conveyer frame 34, and in particular around half way along the length of the conveyer frame 34 between the drum 36 and the end region of the conveyer frame 34 furthest from the drum 36 in the embodiment shown. More specifically, in the embodiment shown, the length of the conveyer 30 from the pivot point provided by the drive shaft 38 to the far end of the conveyer 30 (and more specifically to the grip handle 90) is 1791 mm, and the rotatable connection, or hinge point, 80a for the lifting arms 80 is located 852 mm along the conveyer 30 from the drive shaft 38, so 938 mm from the far end of the conveyer—the rotatable connection 80a is therefore located less than halfway along the conveyer 30 from the drive shaft 38. The skilled person would appreciate that spacings and angles may be carefully considered to provide a suitable lifting angle without exerting an excessive force on treadmill components, as discussed in more detail below.

In alternative embodiments, the rotatable connection 80a may be differently located, for example being closer to the drum 36 (whilst still spaced from the axis of rotation of the drum 36). The skilled person would appreciate that having the rotatable connection 80a closer to the drum 36 may allow for a higher lift angle, but may also increase forces on the arms 80. A position may therefore be selected considering a trade-off between desired maximum conveyer frame lifting angle, and maximum arm thickness allowable in the available space. It will be appreciated that this may vary for different arm materials and designs.

Figure 33:
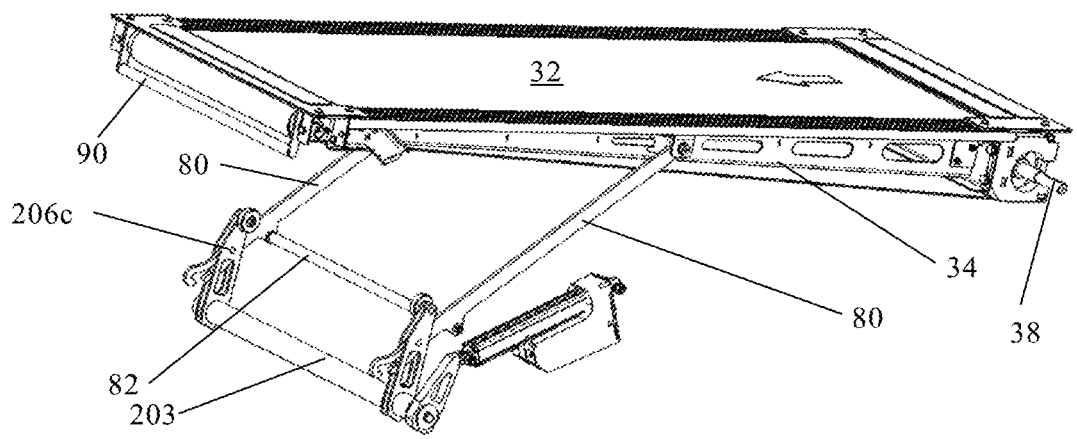
FIG. 33 shows a perspective view of the conveyer of the hydrotherapy apparatus of FIG. 22 in the fourth conveyer position.
Figure 34:
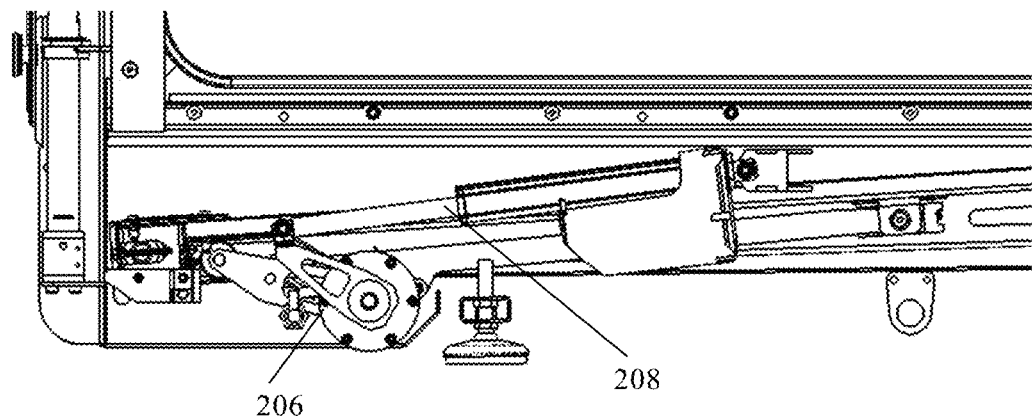
FIG. 34 shows a close-up side view of the actuator of the hydrotherapy apparatus of FIG. 22 in the first conveyer position.
Figure 38:
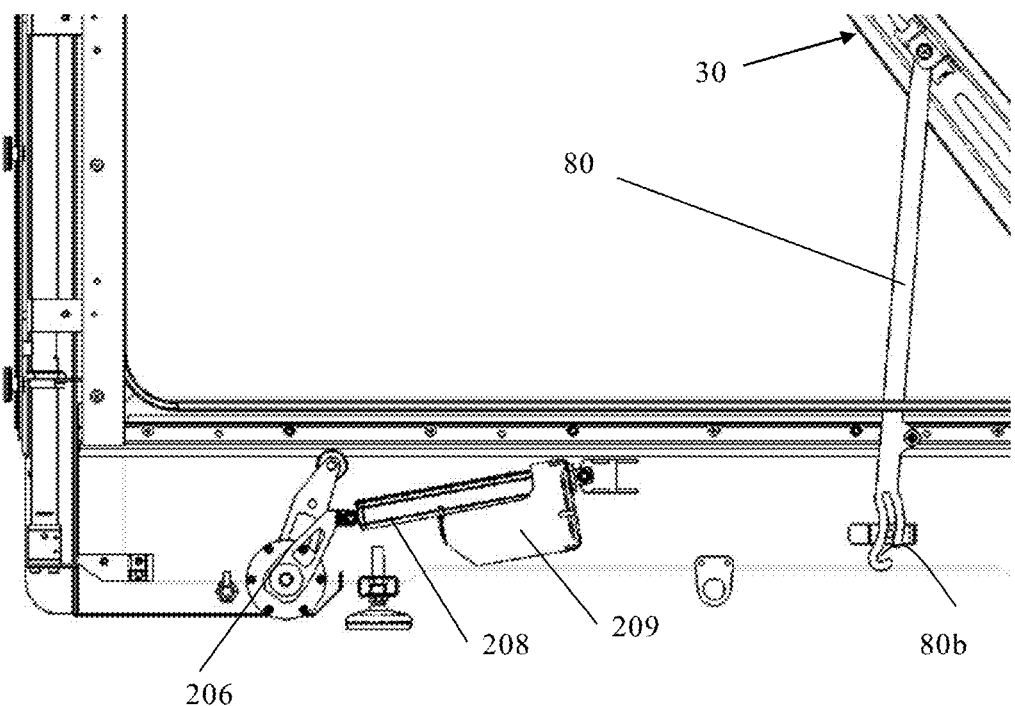
FIG. 38 shows a close-up side view of the actuator of the hydrotherapy apparatus of FIG. 22 in the fifth conveyer position.

The lifting arm 80 extends from its first end region to a second end region. In the embodiment being described, each lifting arm 80 is at least substantially straight and linear, as can be seen most clearly in FIG. 33. Different shapes may be used in other embodiments.

The second end region of the lifting arm 80 is coupled to an electrically-powered piston assembly 250. In the embodiment shown, the actuator 200 is the same as that used for the glider 204 and guide 202 mechanism described above. The electrically-powered actuator 200 is arranged to act on the second end region of the lifting arm 80 so as to cause the lifting arm 80 to move, thereby raising the end region of the conveyer frame 34 furthest from the drum 36. In the embodiment shown, an actuator shaft 208 is provided on only one side of the treadmill 1, and the forces are relayed to the lifting arm 80 on the far side of the treadmill from the actuator shaft 208 by the pivot shaft 203 and/or spacer 82. In other embodiments, a powered actuator shaft 208 may be provided for each arm 80.

The actuator 200 of the embodiment shown is arranged to be able to exert a force of 500 kg (5000 N) onto the strut 206b of the connector 206 (described below), and thereby onto the end of the lifting arm 80 coupled to the connector 206. The bearings 203a holding the shaft 203, the shaft 203, the spacer 82, and the roller arm/connector 206 are all likewise designed to withstand this force without distortion. In the embodiment being described, each lifting arm 80 is detachably coupled to the actuator 200, such that once the conveyer frame 34 has been lifted to the limit of the actuator's movement, the lifting arm 80 can be decoupled so as to allow the conveyer frame 34 to be rotated further. For example, a user may lift/rotate the conveyer frame 34 further by hand, optionally assisted by brake drum-style adjustable blocks as described elsewhere herein, which may be used to reduce the risk of the conveyer frame 34 falling rapidly.

In the embodiment being described, the hydrotherapy apparatus 1 has the glider and guide mechanism (which may be referred to as a first lifting mechanism) as described above, and the second end region of each lifting arm 80 is coupled to the actuator shaft 208, such that the same actuator 200 moves both the glider 204 and the lifting arm 80. In the embodiment being described, the glider 204 is coupled to the actuator shaft 208 by a connector 206. The connector 206 is rotatably mounted on the tank and has the glider 204 mounted thereon. In the embodiment described above, the connector 206 is equivalent to the roller arm 206 described above for earlier embodiments, and comprises two struts, 206a, 206b, each rotatably mounted around the same axis (pivot shaft 203), and one strut 206a coupled to the glider 204 and the other strut 206b coupled to the actuator shaft 208. It will be appreciated that different configurations and designs may be used in other embodiments—for example with a single strut (straight or bent) providing both connections, and/or a differently shaped component, e.g. a disk, taking the place of either or both struts.

The skilled person will appreciate that the force exerted on the lifting arms 80 may not be large as the conveyer 30 is lowered, as the gliders 204 run in their respective guides 202 (e.g. rollers 204 in channels 202). However, when the actuator 200 is retracted far enough to allow the gliders 204 to leave the guides 202, the lifting arms 80 then take a higher load to pivot the (relatively heavy) conveyer 30 about its drive roller axis, via the rotatable attachment points 80a. As the attachment points 80a are relatively close to the pivot axis in the embodiment shown, the force required may therefore be relatively large. In alternative embodiments, the attachment points 80a may be further from the pivot axis, and the force required may be lower, but the maximum lifting angle may therefore also be correspondingly lower.

In the embodiment being described, the connector 206 comprises a pin 206c extending parallel to conveyer width (perpendicular to the strut 206a, in the embodiment shown). In the embodiment shown, the pin 206c is provided on the strut 206a on which the glider 204 is mounted. The second end region of the lifting arm 80 comprises a slot 80b, the slot 80b being arranged to slidingly receive the pin 206c.

Figure 23:
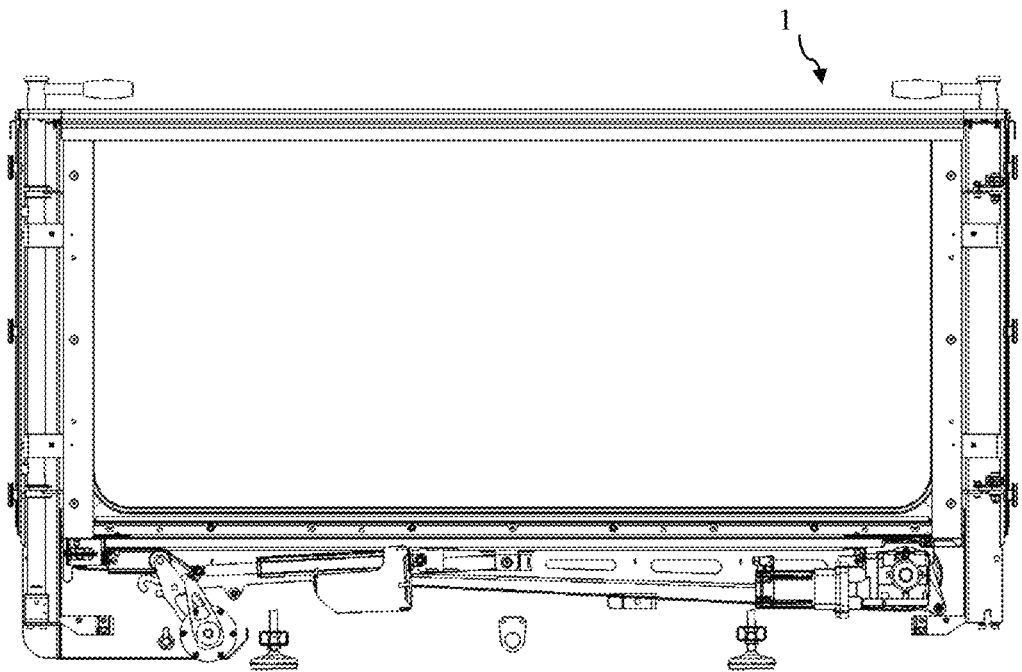
FIG. 23 shows a side view of the hydrotherapy apparatus of FIG. 22 in a slightly raised, horizontal, position (second conveyer position)

As shown in FIGS. 22 and 23, when the treadmill is in use, either in a downwardly sloped position (first position—FIG. 22) or in a slightly raised, horizontal, position (second position—FIG. 23), the lifting arm 80 lies at least substantially parallel to, and in line with, the conveyer frame 34. In the embodiment shown, the lifting arm 80 moves very little, if at all, between these two conveyer positions. Relative movement of the roller 204 and guide 202 (generally caused by the actuator 200) may occur between horizontal and lowered positions of the conveyer 30 without moving the lifting arm 80 significantly, if at all, due to the sliding interaction of the slot 80b and pin 206c.

Figure 24:
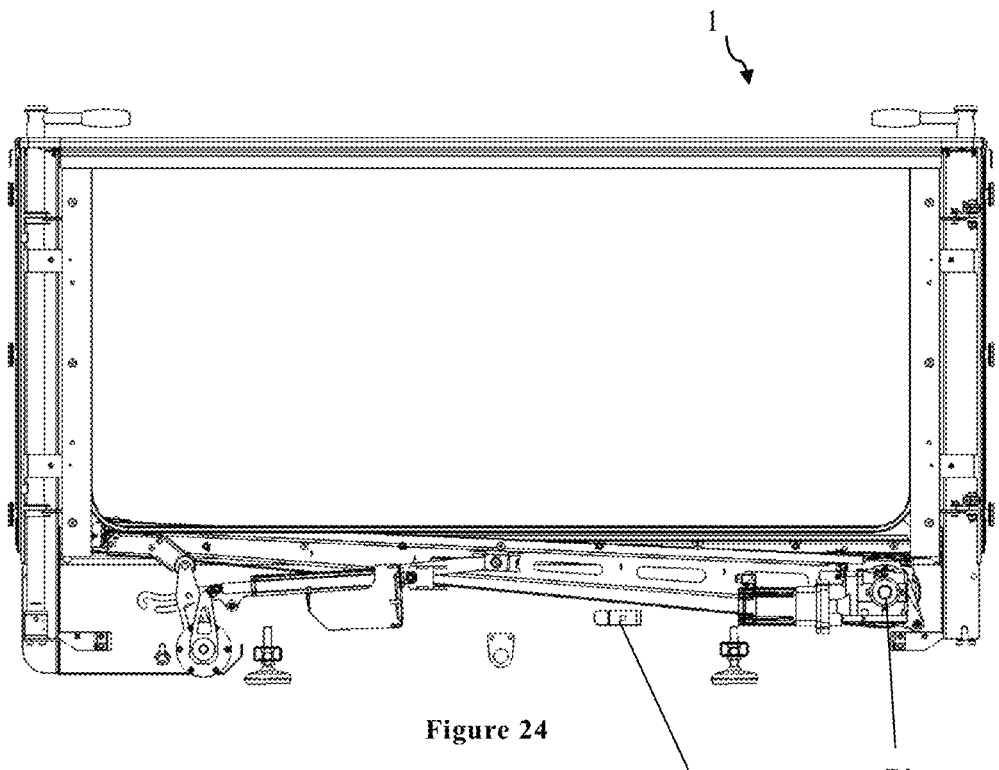
FIG. 24 shows a side view of the hydrotherapy apparatus of FIG. 22 in a raised position in which the end of the conveyer protrudes above the tank base (third conveyer position)

In the embodiment being described, the pin 206c and slot 80b are arranged such that, as the glider 204 moves along the guide 202, the pin 206c slides along the slot 80b. No force, or at least no significant force in the direction along the conveyer frame 34, is therefore applied to the lifting arm 80 as the treadmill moves between the lowered (in use) and horizontal (in use, or preparation for cleaning/maintenance) positions shown in FIGS. 22 and 23. Further, even as the glider 204 is moved into and along the second portion 202b of the guide 202, which is angled with respect to the first portion 202a, the pin 206 may still slide within the slot 80b. The conveyer frame 34 can therefore reach the slightly raised position shown in FIG. 24, with the conveyer end furthest from the drum 36 above the horizontal position, without the lifting arm 80 being engaged, using the first lifting mechanism 202, 204.

The actuator 200 of the embodiment being described therefore only applies a force to the lifting arm 80 once the glider 204 nears or reaches the end of the guide 202 closest to the drum 36, as the pin 206c reaches the end of the slot 80b at that position. The actuator 200 then applies a force to the lifting arm 80 in the direction along the conveyer frame 34, towards the drum 36. As the lifting arm 80 is designed not to compress or bend, and is (rotatably) connected to the conveyer frame 34 at a fixed point, the lifting arm 80 is therefore caused to rotate as its second end region is moved closer to the drum 36 by the actuator 200, thereby raising the conveyer frame 34. It will be appreciated that the end of the conveyer 30 already being lifted above the horizontal (by the guide 202 and glider 204 in this embodiment, although optionally by a different mechanism or manual movement in other embodiments) may allow or facilitate this rotation of the lifting arm 80 and conveyer frame 34.

The hydrotherapy apparatus 1 of various embodiments may therefore comprise a first raising mechanism arranged to lift the conveyer 34 to a first, slightly raised position, just above the horizontal, the first raising mechanism taking any form—optionally that described above using the guide and glider. The lifting arm 80 is arranged to lift/rotate the conveyer 34 from the first position to a second, higher, position. In the embodiment being described, the pin 206c is located on the same strut 206a as the glider 204 and below the glider 204. The slot 80b is shaped to facilitate movement of the glider 204 along the channel 202 without interference from the lifting arm 80. In the embodiment shown, the slot 80b is curved—in particular having a gently-curved U-shape, or crescent shape. The slot 80b is smoothly curved with a centrally-located apex in the embodiment shown. When the arm 80 is in the horizontal position, the apex of the curved slot 80b is the lowermost point on the slot 80b. The slot 80b may take a different shape in other embodiments—the shape may be selected to avoid collision with other components of the treadmill raising and lowering mechanism, and to allow the lifting arms 80 to be correctly-located on the pins 206c so as to provide lifting for the desired range of movement.

Figure 30:
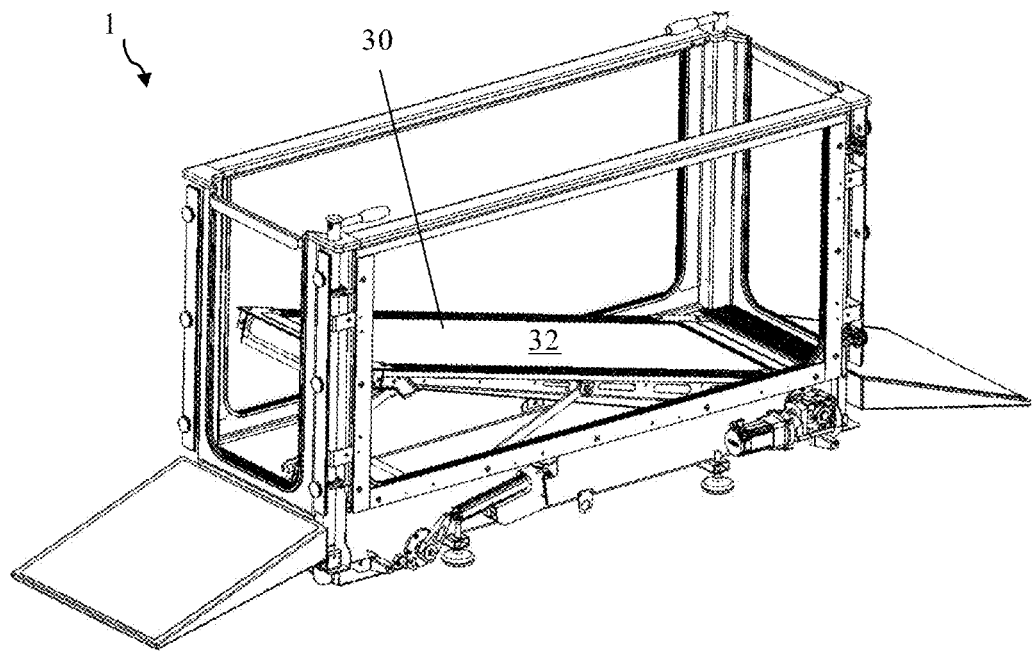
FIG. 30 shows a perspective view of the hydrotherapy apparatus of FIG. 22 in the fourth conveyer position.

As the lifting arm 80 is moved by the actuator 200, the conveyer 34 is lifted/rotated until the actuator shaft 208 reaches the limit of its range of movement. This position is shown in FIGS. 25 and 30, for the embodiment being described, with a treadmill lifting angle of around 150 to 200 above the horizontal. It will be appreciated that the angle may differ in other embodiments, for example being greater than or equal to 10°, and optionally between 150 and 50°. The actuator 200 may be used to lock the conveyer frame 34 in this position for cleaning—the lift angle may be sufficient for a user to sweep out or otherwise clean the base of the treadmill.

In the embodiment being described, the second lifting mechanism is arranged to allow the conveyer frame 34 to be lifted further, beyond the range of movement of the actuator 200, optionally manually. The lifting arm 80 is therefore arranged to be detachable from the actuator 200 to allow further movement. The slot 80b has an opening, as can be seen most clearly in FIG. 39. The opening is located on a lower side of the slot 80b, near the end of the slot further from the drum 36 (in the second end region of the lifting arm 80, near the second end. The opening in the slot is sized and shaped to allow the lifting arm 80 to be detached from the pin 206c—the slot 80b can be hooked over the pin 206c, and then the lifting arm 80 can be lifted off the pin 206c after the lifting arm 80 is pushed/rotated by the actuator 200 to the furthest position obtained using the actuator 200. For example, a user may manually unhook the lifting arm 80 to manually rotate the conveyer 34 further. The lifting arm 80 can then be hooked back onto the pin 206c when the conveyer frame 34 is lowered, e.g. after cleaning/maintenance is complete. The opening in the slot 80b therefore allows the pin 206c to pass therethrough so as to disengage and reengage the lifting arm 80 with the actuator 200. In some embodiments, a guide may be provided to guide the lifting arm 80 back onto the pin 206c as the conveyer 30 is lowered, aligning the opening in the slot 80b with the pin 206c.

In the embodiment being described, the conveyer 30 is more specifically rotated by a total angle ($\Theta_1$) of around 18° by the two lifting mechanisms (and may then be manually lifted further when the lifting arms 80 are disengaged from the actuator 200), the total angle being measured between the lowest position of the treadmill (providing an upward slope for a user to walk on) and the highest position of the treadmill (providing access for cleaning and maintenance when the treadmill is not in use). The lowest position is around 3° to 4° (and optionally more specifically is 3.5°) below the horizontal in the embodiment shown, such that the angle ($\Theta_2$) between the horizontal line and the highest position of the conveyer 30 is around 15°. In the embodiment shown, the first lifting mechanism (provided by the glider 204 and guide 202) is arranged to rotate/lift the conveyer 30 to a maximum angle of around 2° to 3°, and optionally around 2.5°, above the horizontal. Beyond the maximum lift angle of the first lifting mechanism, the glider 204 disengages from the guide 202 and the lifting arms 80 take over the lifting. In other embodiments, the total angle range of movement ($\Theta_1$) may be between 10° and 45°, and optionally between 10° and 30°, and the first lifting mechanism 202, 204 may be arranged to lift the end of the conveyer 30 to an angle of 0.5° to 5° above the horizontal.

Figure 27:
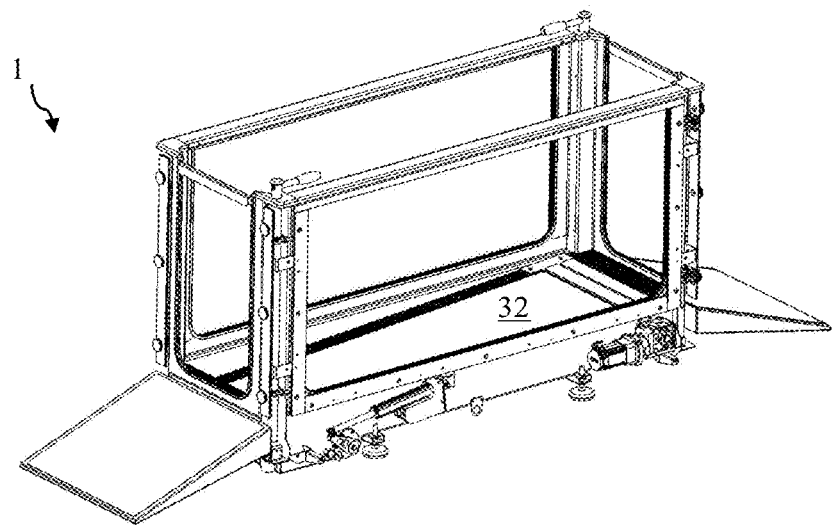
FIG. 27 shows a perspective view of the hydrotherapy apparatus of FIG. 22 in the first conveyer position.
Figure 28:
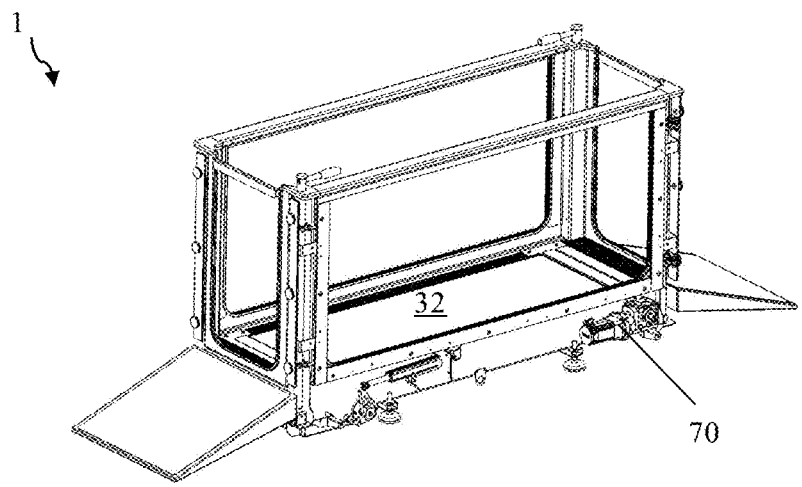
FIG. 28 shows a perspective view of the hydrotherapy apparatus of FIG. 22 in the second conveyer position.
Figure 29:
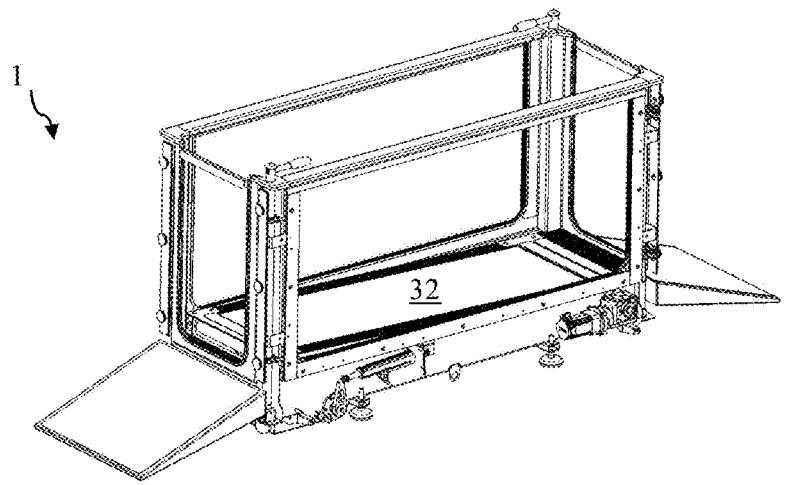
FIG. 29 shows a perspective view of the hydrotherapy apparatus of FIG. 22 in the third conveyer position.
Figure 40:
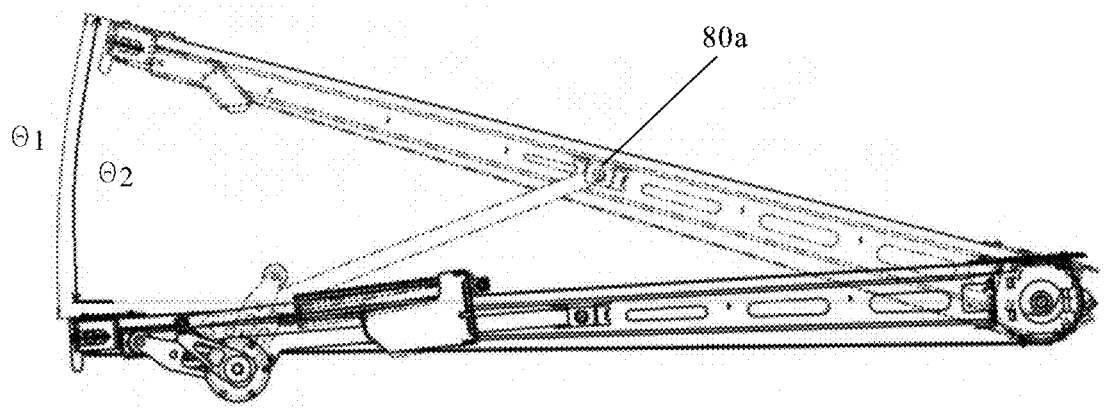
FIG. 40 shows a side view of the conveyer of FIG. 22 in two different positions.

The treadmill 1 of the embodiment being described may be thought of as having three main "modes" with regard to its incline mechanism (lifting mechanism) which alters the angle of the conveyer 30 relative to the tank 10. The floor of the tank 10 is normally arranged to be horizontal, so this incline angle is also discussed as an angle relative to the horizontal. In a "normal use" mode, the conveyer 30 is flat and level (horizontal) and movement of the belt 32 can be started/stopped and speed of the belt 32 movement varied (see e.g. FIG. 1 and FIG. 28). If the user or operator determines that additional resistance is required (increased intensity/difficulty of exercise), the end of the conveyer 30 can be lowered from its level/horizontal position, so providing a second mode of operation. For example, the conveyer 30 may be lowered by a rotation angle of a maximum of 3.5 degrees below the horizontal, and may be held at any position in-between (see FIGS. 13 and 27). In addition to the two "use" modes described above, for cleaning and servicing purposes the conveyer 30 may be raised/inclined up above the horizontal, for example to give sufficient access to clean out any debris from the tank base/sump during day-to-day operation (see FIG. 30). For example, the conveyer 30 may be raised to an angle of approx. 15° above the horizontal. This may give a total range of motion of approx. 18° (see FIG. 40).

During use of the treadmill 1, in a level or declined position, the lifting mechanism is required to support not only the weight of the conveyer 30, but also that of the end user (be that a therapist and/or an animal undergoing a session). The guide and glider arrangement 202, 204 is therefore required to be able to support this weight, at least over the angle range of "declined" to "horizontal". The conveyer 30 is raised above the horizontal only for cleaning or servicing purposes, so the lifting mechanism may not be required to support anything other than the conveyer weight for the range of movement marked by angle $\Theta_2$ in FIG.

40—inclination above the horizontal. Two different sets of demands are therefore placed on the lifting mechanism, for different portions of the total range of motion required. The embodiment being described takes advantage of this by using a first lifting mechanism 202, 204 for a first part of the movement (more specifically, from the lowest declined position, to a position just above the horizontal), and a second lifting mechanism 80 for the second part of the movement. The lifting arms 80 form a part of the second lifting mechanism and are therefore not required to be strong enough to lift a user as well as the conveyer 30; the size and weight of the lifting arms 80 can therefore be reduced (for a given material) as compared to if they had to take the full user weight in addition to that of the conveyer 30. In the embodiment being described, the arrangement of the first and second lifting mechanisms, as described herein, allows the conveyer 30 to be moved throughout the full range using just a single linear actuator 200, the linear actuator having a 200 mm stoke length in the described embodiment.

When the conveyer 30 is horizontal or declined, the conveyer 30 is supported by the gliders 204 (in particular, by a roller 204 in a channel, 202 on either side of the conveyer 30). When the 'cleaning' mode is required, the weight of the conveyer 30 is transferred initially to an angled section of the guide 202 (the weight still being supported by the gliders 204) before becoming completely supported by the lifting arms 80 when the gliders 204 disengage from the guides 202. The "ramp" portion 202b of the guide 202 allows the conveyer 30 to be lifted above the horizontal while the weight of the conveyer 30 is still supported by the gliders 204. The lifting arms 80 are therefore at a less shallow angle than otherwise when they are first required to bear the full weight of the conveyer 30. The skilled person would appreciate that the shallower the angle, the more force the incline mechanism is under, as the lifting arms 80 would need to support a larger proportion of the weight (noting that some of the weight is supported by the drive shaft 38). For the embodiment shown, it was determined experimentally that the amount of the weight of the conveyer 30 to be supported at the angle at which the gliders 204 disengage from the guide 202 (and hence stop supporting the weight) was 20 kg. This was measured at the location of the lifting handle/grip bar 90, for ease of measurement. In the embodiment shown, the handle 90 is 1790 mm from the pivot point (drum shaft 38) of the conveyer 30 (centre to centre), with the conveyer 30 in this position being +2.5° degrees above the horizontal. This point in the range of motion of the lifting mechanism is significant as it is where the conveyer lifting operation transitions from that of being supported directly via the gliders 204 (with the force transmitted vertically down through the mechanism) to that of being supported by the lifting arms 80—in the embodiment being described, this also coincides with the maximum force transmitted through the lifting mechanism as a whole. This relatively high maximum force is due to the relatively shallow angle at which the lifting arms 80 are required to start bearing the weight (the force would be higher still were the first lifting mechanism not used). As mentioned above, there is a trade-off between maximum force on the lifting arms 80 and maximum lift angle above the horizontal—a different trade-off position may be chosen in other embodiments. The determined maximum force was then used in designing lifting mechanism components. This was calculated at 2250 N in total, or 1125 N being transferred via each lifting arm 80.

In the embodiment shown, grade 316 stainless steel (S/S 316) is used for most lifting mechanism components, in part for its strength and in part for its resistance to corrosion, given that these components are generally submerged in (often chlorinated or otherwise treated) water in use. S/S 316 may also be used for other treadmill components, especially those designed to be submerged in use. It will be appreciated that other, generally more expensive materials, may offer improved strength for a given size and weight, and that component sizes, thicknesses, and designs described below may be adapted accordingly. In the embodiment shown, S/S 304 is used for non-submerged components where high strength is required, with S/S 316 otherwise being preferred for its higher corrosion resistance.

Figure 42:
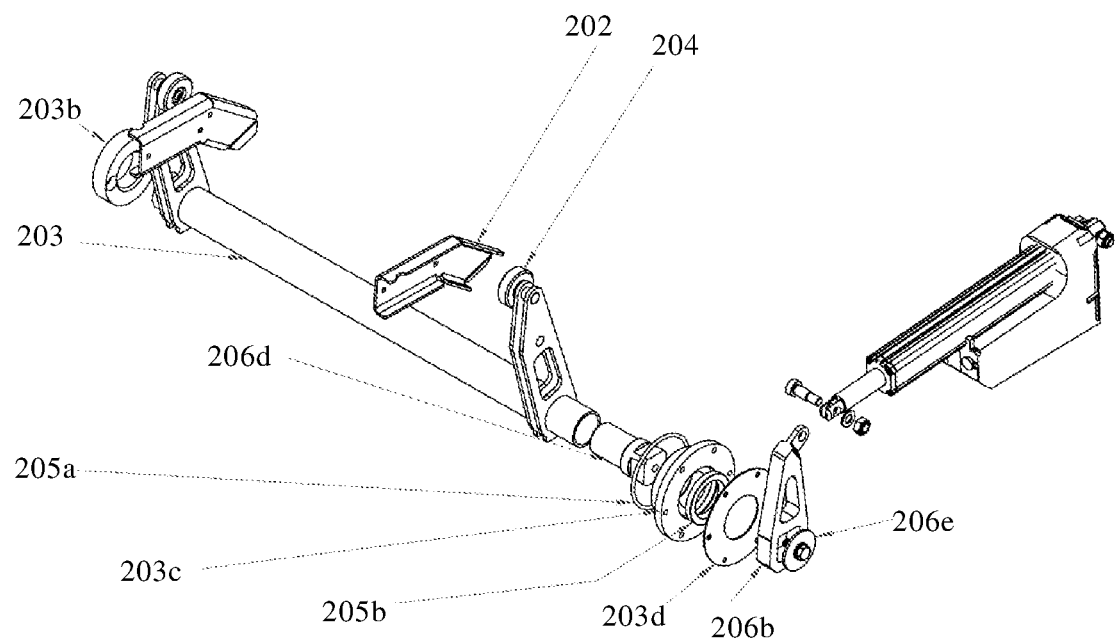
FIG. 42 shows a perspective view of components of the lifting mechanism.

Extra details of the lifting mechanisms of the embodiment being described are shown in FIG. 42. The following component properties were selected, bearing in mind the forces required to be supported, for the treadmill 1 of the embodiment being described. It will be appreciated that these values are not limiting, and may be adjusted as appropriate for different treadmill designs.

Figure 41:
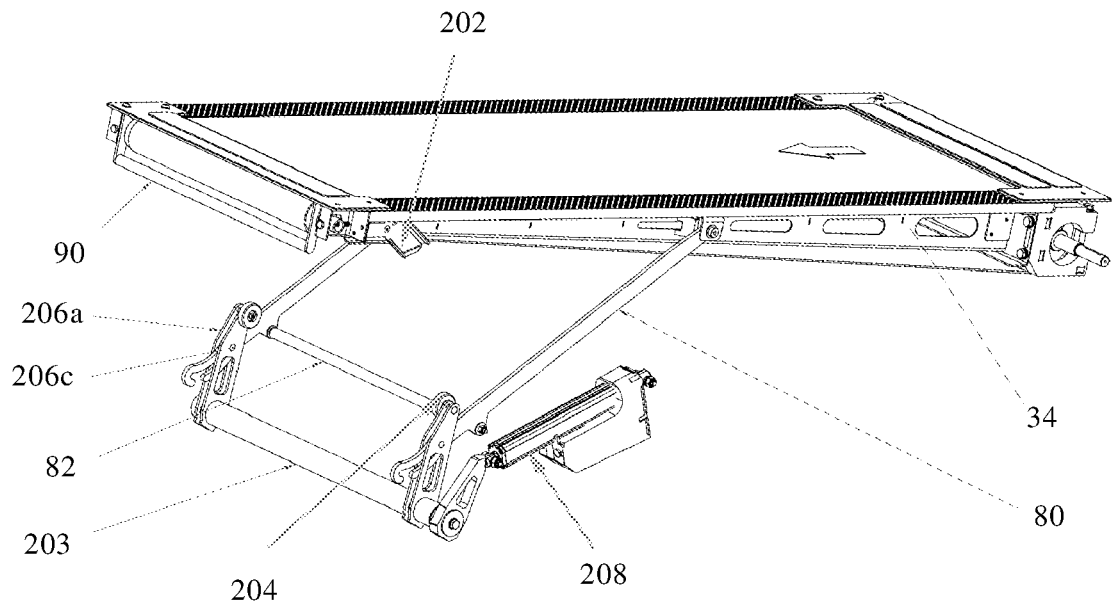
FIG. 41 shows a perspective view of the conveyer of FIG. 22, emphasizing components of the first and second lifting mechanisms.

Treadmill lifting handle 90: S/S 316, round tube with a diameter of 19.1 mm and a wall thickness of 1.6 mm;

Strut 206a of the connector 206 (corresponding parts 206a on each side of the conveyer 30, as shown in FIG. 41, have the same properties): double-walled, each wall being 5.0 mm gauge S/S 316;

Pin 206c of the connector 206 (likewise, both pins 206c have the same properties): Round solid bar of 12 mm diameter, S/S 316;

Shaft 203 (arranged to join the connectors 206 at each side of the conveyer 30, and to transfer torque therebetween; may be referred to as a torque tube): Round tube, 44.5 mm diameter and 3 mm wall thickness, S/S 316;

Spacer/Lift arm handle 82: Round tube, 19.1 mm diameter and 1.6 mm wall thickness, S/S 316;

Lifting arms 80: 8.0 mm gauge S/S 316, 31.0 mm width, 664 mm length from the centre of the rotation axis (the rotatable connection 80a) on the conveyer 30 to the centre of pin 206c when it engages the end of the slot 80b;

Drive shaft 38: S/S 316 machined component—sized as applicable for the motor etc., in this case having a 25 mm diameter shaft, turned down to 20 mm where it connects to the motor, the shaft 38 having a total length of 748 mm, of which 72 mm is at the reduced diameter of 20 mm;

Conveyer frame 34 (specifically—side rail of conveyer frame 34): 2.5 mm gauge S/S 316;

Guide 202 (more specifically in this embodiment, channel including an angled "ramp" portion): 3.0 mm gauge S/S 316;

Glider 204 (more specifically in this embodiment, roller): disc-shaped machined component made of plastic—Acetal, 46.0 mm diameter and 17.0 mm width;

Shaft/torque tube support block 203b (internal): disc-shaped machined component made of plastic—Acetal, sized and shaped to support the shaft 203 in a region internal to the tank 10 (a bearing may be inserted around parts 203 and 203b from outside of the tank 10);

Shaft/torque tube support block 203c (external): disc-shaped machined component made of plastic—Acetal, sized and shaped to support the shaft 203 in a region external to the tank 10, i.e. not submerged/outside of the tank (forming part of the support block 212);

Support block clamping plate 203d (external): 1.5 mm gauge S/S 316, forming part of the support block 212;

Seal components 205: a rubber O-ring 205a (53 mm internal diameter, 3.5 mm cross-section diameter) is located between the external shaft support block 203c and an external surface of the tank base, and a mechanical seal 205b (63.5 mm external diameter, 44.5 mm internal diameter, 8 mm cross-sectional thickness) is located between the external shaft support block 203c and the support block clamping plate 203d (more specifically, this seal 205b is at least substantially accommodated within a recess within the external shaft support block 203c in the embodiment shown);

Second strut 206b of the connector 206: machined component, 20.0 mm thick S/S 304—as this strut, which couples the shaft 203 too the actuator 200, is located outside of the tank (on the far side of the seal components 205 and tank base wall from the first strut 206a), S/S 304 is chosen for the increased strength as compared to S/S 316—the lower corrosion resistance is less of an issue for a non-submerged component;

Actuator block 206d: the actuator block 206d is rigidly connected to the end of the shaft 203 adjacent the actuator 200, and has a non-circular end (in this embodiment, at least substantially square) arranged to engage with an aperture in the second strut 206b, so as to transfer the torque applied to the second strut 206b by the actuator 200 to the shaft 203. The second strut 206b cannot rotate with respect to the actuator block 206d once the two are engaged (e.g. by sliding the second strut onto the actuator block from outside of the tank 10). The actuator block 206d of this embodiment is a machined component, with a 44.5 mm diameter, and, as it is not in contact with water in use, it is made of S/S 304 for improved strength;

Actuator clamping washer 206e: 3.0 mm gauge, S/S 316. The washer 206e is located on the far side of the second strut 206b from the actuator block 206d. In the embodiment shown, the clamping washer 206e is connected to the actuator block 206d by a screw or bolt, the actuator block 206d comprising a threaded aperture arranged to receive the screw or bolt.

Figure 39:
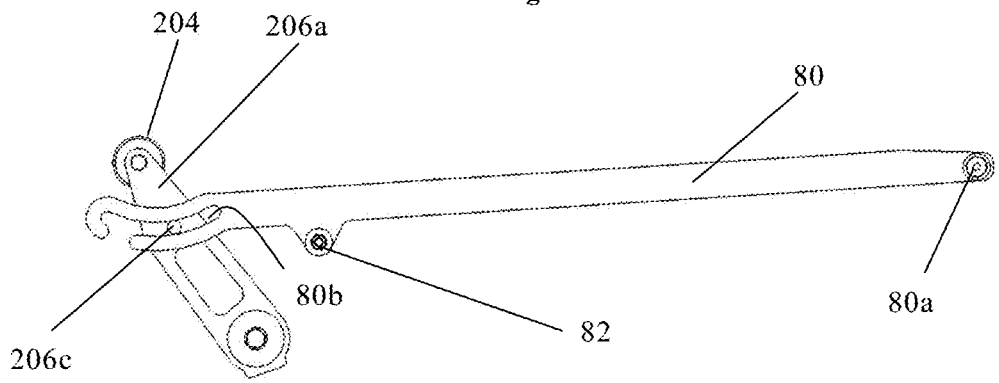
FIG. 39 shows a close-up side view of the lifting arm and pin

In the embodiment shown, the connector 206, and in particular the strut 206a of the connector, is double-walled, with the pin 206c extending between the walls. FIG. 39 therefore shows a sectional view, through this strut 206a. The lifting arm 80 is arranged to pass between the connector walls in the embodiment shown. The pin 206c may instead extend from one side of the connector 206, and/or the connector 206 may take a different shape, in other embodiments.

Figure 31:
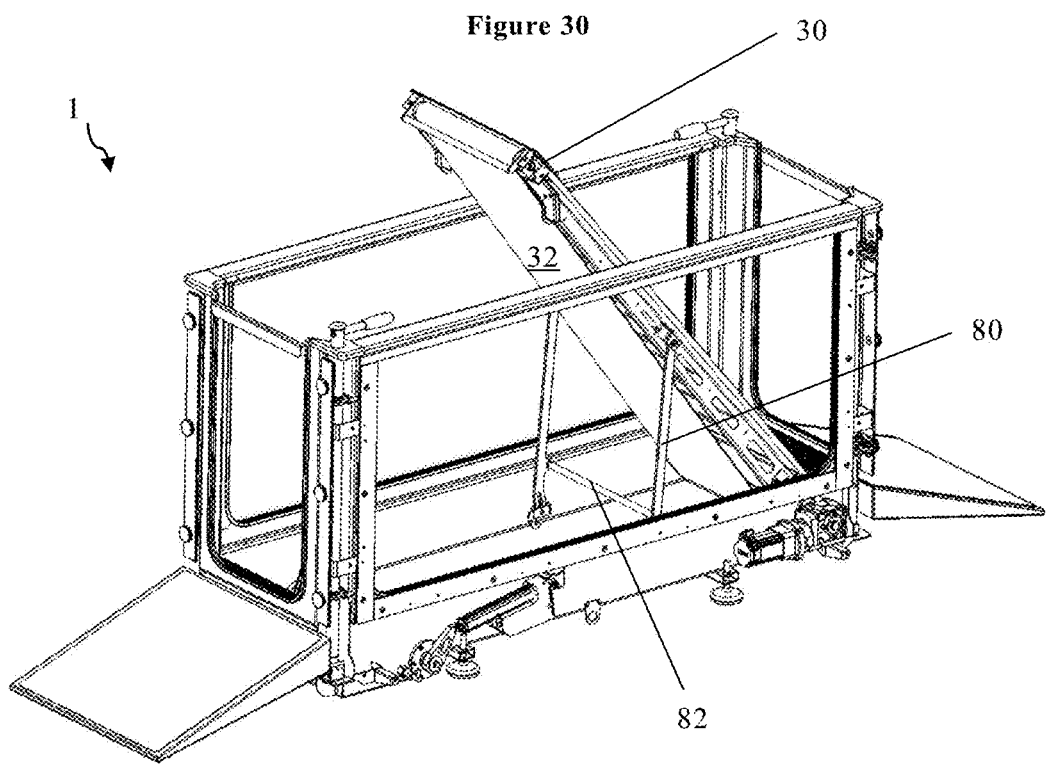
FIG. 31 shows a perspective view of the hydrotherapy apparatus of FIG. 22 in the fifth conveyer position.
Figure 32:
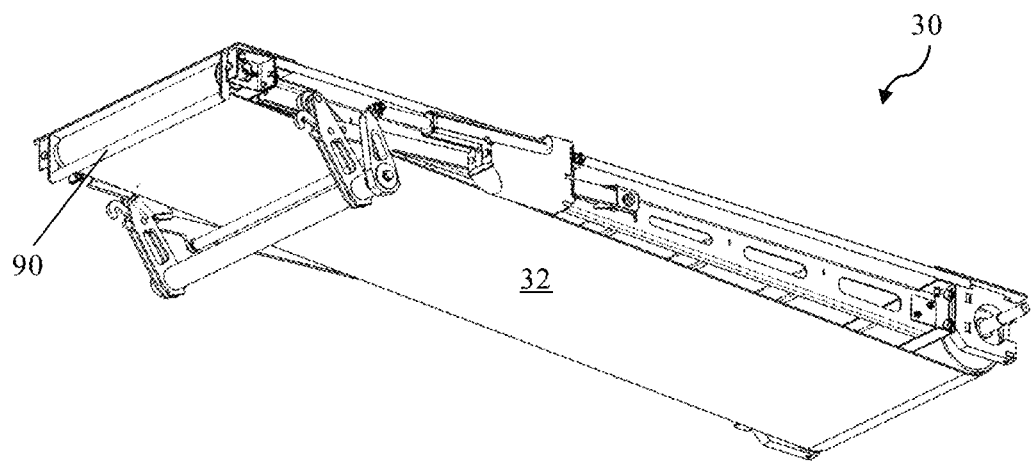
FIG. 32 shows a perspective view of the conveyer of the hydrotherapy apparatus of FIG. 22 in the second conveyer position.

In the embodiment being described, once the lifting arm 80 has been unhooked from the pin 206c, and so decoupled from the actuator 200, the conveyer frame 34 can be rotated further. The tank 10 comprises an attachment point 84 arranged to receive the second end region of the lifting arm 80 when the conveyer 34 is rotated further, so securing the conveyer 30 in the further rotated position. This further-raised position may be referred to as a maintenance position, and may be used less regularly than the cleaning position obtained by movement of the lifting arms 80 by the actuator 200. A symmetrical attachment point 84 is provided on each side of the apparatus 1 in the embodiment shown. In particular, in the embodiment shown, the attachment point 84 comprises a pin, and the lifting arm 80 can be hooked onto the pin of the attachment point 84 in much the same way as it is hooked on to the pin 206c of the actuator 200. The attachment point 84 can therefore hold the conveyer 34 in the further raised position shown in FIGS. 26 and 31, with the lifting arm(s) 80 supporting the weight of the conveyer 34. When the conveyer 34 is to be lowered—e.g. after a thorough cleaning process or maintenance process requiring full access, the lifting arms 80 can be unhooked from the attachment points 84, rotated so their second end regions are further from the drum 36, and then hooked onto the actuator pins 206c as the conveyer 34 is lowered. The brake drum-style grips 40, 50 provided in some embodiments, as described elsewhere herein, may be used to facilitate a smooth lowering process.

A method 1000 of raising a conveyer 30 using an actuator 200 as described above is illustrated in FIG. 21.

The method 1000 comprises actuating 1002 an actuator shaft (e.g. a piston) 208 so as to move a glider 204 along a guide 202. The movement of the glider 204 along the guide 202 pushes an end region of the conveyer frame 34 furthest from the drum 36 upwards so as to raise that end of the conveyer 30. The movement of the glider 204 along the guide 202 is in a direction perpendicular to and towards an intended rotation axis of the conveyer 30 (i.e. towards the drum 36) in the embodiment shown.

In the embodiment being described, the actuating step 1002 raises the end (A) of the conveyer 30 far enough that an underside of the conveyer frame 34 is accessible. In this embodiment being described, the end of the conveyer 30 is lifted far enough that a person's hand can be inserted beneath the conveyer 30 at the raised end. In alternative or additional embodiments, the lifting 1002 may provide access to one or more lifting points, such as one or more sockets arranged to receive a bar, handle, or other tool or one or more handholds, as well as, or instead of, making the underside of the conveyer frame 34 accessible. The socket or handhold of such embodiments is arranged to be inaccessible before the conveyer 30 is raised by the actuator 200, so minimising or avoiding any trapping risk due to the socket or handhold. The socket or handhold may be provided in a side edge of the conveyer frame 34 rather than an underside of the conveyer frame, so requiring less raising of the conveyer 30 for access. In alternative or additional embodiments, the lifting 1002 may bring a second lifting mechanism into alignment to perform further, electrically-powered, lifting of the conveyer 30. Access by a user 2 to one or more lifting points (using a hand or tool) therefore may not be required.

The method 1000 further comprises lifting 1004 the end (A) of the conveyer 30 further upwards (for example by hand or using a tool inserted into a socket, or by using lifting arms as described with respect to the embodiment shown in FIG. 22). The glider 204 may come out of the guide 202 as the conveyer 30 is lifted further.

In the embodiment described with respect to FIGS. 1 to 18, the lifting 1004 may be performed manually, e.g. by a person exerting an upwards force on the end of the conveyer 30, either with a hand beneath, or gripping the end of, the conveyer 30, or via a tool inserted into an exposed socket or the like.

In some embodiments, such as those described with respect to FIG. 22 onwards, a second stage of electrically-powered lifting may be provided. In all embodiments, a grip bar 90 may be provided at the end of the conveyer 30, for ease of manual lifting—either from the third position (in embodiments with no lifting arms) or from the fourth position (in embodiments with lifting arms 80).

In embodiments with adjustable blocks 50, the lifting step 1004 may be equivalent to the lifting 902 of the method 900 described above, and the blocks 50 may then be used 904 to hold the conveyer 30 in the raised position.

In the embodiments disclosed herein, the conveyer 30 is designed to have a relatively low weight, so as to facilitate lifting of the conveyer 30 as described above. For example, the conveyer 30 may have a total weight of approximately 50 kg, or less. Further, the weight may be mostly distributed towards the drive end of the conveyer 30—i.e. towards the drum 36. As the drum 36 is arranged to rotate on its shaft as the conveyer 30 is raised, rather than being lifted itself, lifting of the drum weight is not required. In various embodiments, the effective weight to be lifted may be around 15 kg (a safe weight for manual handling).

The skilled person would appreciate that the brake drum-style adjustable blocks for impeding conveyer rotation disclosed herein may be used with or without an actuator for treadmill raising and lowering as disclosed herein, and vice versa. Further, the first lifting mechanism (roller and glider) may be used with or without the second lifting mechanism (lifting arms), and vice versa. Whilst the mechanisms are used together in the embodiments shown in the Figures, each may be used alone in other embodiments. It will be appreciated that using all three mechanisms together may provide synergetic benefits, resulting in a hydrotherapy apparatus 1 which provides a wide range of lifting options and controls with relatively few moving parts and relatively few components or crevices within the tank 10, so improving safety and ease of cleaning and maintenance.

We claim:

1. A hydrotherapy apparatus comprising:
   a tank;
   a conveyer mounted within the tank-, the conveyer comprising a belt and a drum, wherein the belt is arranged to be driven by rotation of the drum and the drum comprises a drive shaft extending therefrom, and a conveyer frame extending from the drum, perpendicular to the drive shaft, and arranged to keep the belt under tension, the drum being rotatably mounted on the conveyer frame, wherein the conveyer is arranged to be rotatable around the axis of the drive shaft; and
   an actuator comprising:
   a guide mounted on an end region of the conveyer frame furthest from the drum, the guide comprising a first portion and a second portion angled downwards with respect to the first portion, the second portion being closer to the drum than the first portion;
   a glider arranged to be received by the guide; and
   an actuator shaft mounted on the tank and arranged to move the glider,
   and wherein the conveyer is arranged to be rotated around the axis of the drive shaft by the actuator shaft moving the glider along the first portion of the guide and onto the second portion of the guide, thereby raising the end region of the conveyer frame furthest from the drum.

2. The hydrotherapy apparatus of claim 1, wherein the first portion of the guide is oriented parallel to the belt.

3. The hydrotherapy apparatus of claim 1, wherein the hydrotherapy apparatus further comprises a rotatable glider arm on which the glider is mounted, the rotatable glider arm being rotatably mounted on the tank and arranged to be rotated by the actuator shaft.

4. The hydrotherapy apparatus of claim 1, wherein the hydrotherapy apparatus further comprises a second guide symmetrical to the first guide and mounted on the end region of the conveyer frame furthest from the drum, on the opposite side of the belt from the first guide.

5. The hydrotherapy apparatus of claim 1, wherein movement of the actuator shaft is arranged to raise the end region of the conveyer frame furthest from the drum far enough to raise it above a lower edge of the tank such that an underside of the conveyer is made accessible.

6. The hydrotherapy apparatus of claim 1, wherein the glider and guide are arranged such that the guide is capable of being lifted off the glider, when the end region of the conveyer frame furthest from the drum is raised further, so allowing the conveyer frame to be raised further.

7. The hydrotherapy apparatus of claim 1, wherein the hydrotherapy apparatus is arranged such that, when the conveyer frame is lowered towards the actuator shaft, the glider connects with the guide and one or more of:
   (i) the weight of the conveyer frame,
   (ii) a force applied by a user lowering the conveyer, and
   (iii) a force applied by the actuator,
   causes the glider to move from the second portion of the guide to the first portion of the guide, so capturing the conveyer frame and holding it in a low position.

8. The hydrotherapy apparatus of claim 1, wherein the guide is a channel and the glider is a roller arranged to move within the channel.

9. The hydrotherapy apparatus of claim 1, further comprising:
   a pair of bearing housings fixedly mounted on the tank and extending into the tank, each bearing housing of the pair of bearing housings being arranged to rotatably receive a portion of the drive shaft, and having a cylindrical portion extending around the portion of the drive shaft; and
   a pair of blocks fixedly mounted on the conveyer frame, each block of the pair of blocks comprising an aperture therethrough arranged to receive a respective bearing housing of the pair of bearing housings and portion of the drive shaft, and wherein each of the blocks is adjustable between:
   (i) a first configuration in which the aperture is sized to receive the cylindrical portion of the respective bearing housing; and
   (ii) a second configuration in which the aperture is restricted to grip the outer surface of the cylindrical portion of the respective bearing housing, so impeding rotation of the conveyer.

10. The hydrotherapy apparatus of claim 1, further comprising:
    a connector arranged to couple the glider to the actuator shaft, the connector being rotatably mounted on the tank, and having the glider mounted thereon;
    a pin mounted on the connector and extending parallel to conveyer width; and
    a lifting arm rotatably connected to the conveyer frame, at a position spaced from the drum, at a first end region of the lifting arm, and comprising a slot in a second end region of the lifting arm, the slot being arranged to slidingly receive the pin,
    and wherein the pin and slot are arranged such that, as the glider moves along the guide, the pin slides along the slot, such that the actuator only applies a force to the lifting arm in a direction along the conveyer once the glider nears or reaches the end of the guide closest to the drum.

11. A hydrotherapy apparatus comprising:
    a tank;
    a conveyer mounted within the tank, the conveyer comprising a belt and a drum, wherein the belt is arranged to be driven by rotation of the drum and the drum comprises a drive shaft extending therefrom, and a conveyer frame extending from the drum, perpendicular to the drive shaft, and arranged to keep the belt under tension, the drum being rotatably mounted on the conveyer frame, wherein the conveyer is arranged to be rotatable around the axis of the drive shaft;

a pair of bearing housings fixedly mounted on the tank and extending into the tank, each bearing housing of the pair of bearing housings being arranged to rotatably receive a portion of the drive shaft, and having a cylindrical portion extending around the portion of the drive shaft; and a pair of blocks fixedly mounted on the conveyer frame, each block of the pair of blocks comprising an aperture therethrough arranged to receive a respective bearing housing of the pair of bearing housings and portion of the drive shaft, and wherein each of the blocks is adjustable between:

(i) a first configuration in which the aperture is sized to receive the cylindrical portion of the respective bearing housing; and (ii) a second configuration in which the aperture is restricted to grip the outer surface of the cylindrical portion of the respective bearing housing, so impeding rotation of the conveyer.

12. The hydrotherapy apparatus of claim 11 further comprising a seal, and wherein a bearing housing of the pair of bearing housings is arranged to accommodate at least a part of the seal such that the portion of the drive shaft extending thereinto passes from a wet zone including the conveyer to a dry zone.

\* \* \* \* \*